(12) United States Patent
Tsunehiro et al.

(10) Patent No.: US 7,809,935 B2
(45) Date of Patent: Oct. 5, 2010

(54) COMPUTER SYSTEM FOR SELECTING A USEABLE COMPUTER BOARD TO POWER ON AND ACCESSING CORRESPONDING STORAGE BASED ON TERMINAL REQUEST THAT INCLUDES USER INFORMATION

(75) Inventors: Takashi Tsunehiro, Ebina (JP); Satoshi Kikuchi, Yokohama (JP); Shinji Kimura, Sagamihara (JP); Takatoshi Kato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1090 days.

(21) Appl. No.: 11/502,600

(22) Filed: Aug. 11, 2006

(65) Prior Publication Data
US 2007/0073729 A1 Mar. 29, 2007

(30) Foreign Application Priority Data
Sep. 28, 2005 (JP) ............................. 2005-281083

(51) Int. Cl.
*G06F 15/177* (2006.01)
(52) U.S. Cl. ..................... 713/2; 709/222; 709/226; 713/300
(58) Field of Classification Search ................ 709/222, 709/226; 713/2, 300
See application file for complete search history.

(56) References Cited

U.S. PATENT DOCUMENTS

| 6,598,077 B2 * | 7/2003 | Primak et al. ............... 709/219 |
| 6,859,882 B2 * | 2/2005 | Fung ........................... 713/300 |
| 7,051,165 B2 | 5/2006 | Kimura et al. |
| 2003/0204562 A1 | 10/2003 | Hwang |
| 2003/0217278 A1 | 11/2003 | Kimura et al. |
| 2004/0153640 A1 | 8/2004 | Sugita et al. |
| 2004/0186961 A1 | 9/2004 | Kimura et al. |
| 2005/0091333 A1 | 4/2005 | Kobayashi et al. |

(Continued)

FOREIGN PATENT DOCUMENTS

JP 2003-337736 11/2003

(Continued)

OTHER PUBLICATIONS

U.S. Appl. No. 10/566,943, Kato et al.

(Continued)

*Primary Examiner*—Albert Wang
(74) *Attorney, Agent, or Firm*—McDermott Will & Emery LLP

(57) ABSTRACT

A invented computer system has a plurality of computer boards; a plurality of terminals, each of which is coupled to each of the computer boards respectively via a network; a storage device having a plurality of storage areas, which is coupled to each of the computer boards; and a management computer; and wherein the management computer manages a correspondence between a user information and the storage area, and when a use request of the computer board is transmitted from a terminal, the management computer selects a usable computer board to turn on a power, reads information necessary to start the computer board from the storage corresponding to the transmitted user information, allows the computer board to start based on the read information, and notifies the terminal of information on the started computer board and identification information on the network allocated to the started computer board.

8 Claims, 35 Drawing Sheets

U.S. PATENT DOCUMENTS

| | | |
|---|---|---|
| 2005/0228948 A1 | 10/2005 | Mikuma et al. |
| 2005/0283575 A1 | 12/2005 | Kobayashi et al. |
| 2006/0075196 A1 | 4/2006 | Kobayashi et al. |
| 2006/0155837 A1 | 7/2006 | Kobayashi et al. |

FOREIGN PATENT DOCUMENTS

| | | |
|---|---|---|
| JP | 2004-094411 | 3/2004 |
| JP | 2004-287476 | 10/2004 |
| JP | 2004-287477 | 10/2004 |
| JP | 2004-295270 | 10/2004 |
| JP | 2005-128731 | 5/2005 |
| JP | 2005-235159 | 9/2005 |
| JP | 2005-301708 | 10/2005 |
| JP | 2005-327233 | 11/2005 |
| JP | 2006-011541 | 1/2006 |
| JP | 2006-107150 | 4/2006 |
| JP | 2006-195703 | 7/2006 |

OTHER PUBLICATIONS

U.S. Appl. No. 10/564,467, Tsunehiro et al.
U.S. Appl. No. 11/124,233.

* cited by examiner

FIG.3

1301 TABLE

| NO. 1302 | POWER STATE 1303 | USER NAME 1304 | ATTRIBUTE INFORMATION 1305 | RUNNING STATE 1306 |
|---|---|---|---|---|
| 1 | ON | Ichiro | CPU CLOCK, MEMORY, OTHERS | RUNNING |
| 2 | OFF | Taro | CPU CLOCK, MEMORY, OTHERS | — |
| 3 | ON | Yoshiko | CPU CLOCK, MEMORY, OTHERS | SUSPEND |
| n | OFF | — | CPU CLOCK, MEMORY, OTHERS | — |

FIG.4

1311 INACTIVE USER LIST

| USER NAME 1312 | APPLIED PRINTED-CIRCUIT-BOARD NO. 1313 | ATTRIBUTE INFORMATION 1314 |
|---|---|---|
| Taro | 2 | CPU CLOCK, MEMORY, OTHERS |
| Hanako | 5 | CPU CLOCK, MEMORY, OTHERS |
| — | — | — |
| — | — | — |

FIG.5

USER USED REGION LIST (1401)

| USER NAME (1402) | HARD DISK DESIGNATION (1403) | LOGICAL UNIT (1404) |
|---|---|---|
| Taro | harddisk1.system.com | 0000 |
| Hanako | 192.168.10.12 | 0100 |
| Yoshiko | harddisk1.system.com | 0036 |
| — | — | — |

FIG.24

ACCESS MANAGEMENT LIST (3002)

| CLIENT IDENTIFIER (3003) | STORAGE IDENTIFIER (3004) | |
| --- | --- | --- |
| | HARD DISK DESIGNATION | LOGICAL UNIT (3005) |
| Taro | harddisk1.system.com | 0000 |
| Hanako | 192.168.10.12 | 0100 |
| Yoshiko | harddisk1.system.com | 0036 |
| — | — | — |

FIG.27

1301 TABLE

| NO | POWER STATE | USER NAME | ATTRIBUTE INFORMATION | RUNNING STATE | GROUP |
|---|---|---|---|---|---|
| 1 | ON | Ichiro | CPU CLOCK, MEMORY, OTHERS | RUNNING | 1 |
| 2 | OFF | Taro | CPU CLOCK, MEMORY, OTHERS | — | 1 |
| 3 | ON | Yoshiko | CPU CLOCK, MEMORY, OTHERS | SUSPEND | 1 |
| ... | ... | ... | ... | ... | ... |
| n | OFF | — | CPU CLOCK, MEMORY, OTHERS | — | 1 |
| 1 | ON | Jiro | CPU CLOCK, MEMORY, OTHERS | RUNNING | 2 |
| 2 | OFF | — | CPU CLOCK, MEMORY, OTHERS | — | 2 |
| 3 | OFF | — | CPU CLOCK, MEMORY, OTHERS | — | 2 |
| ... | ... | ... | ... | ... | ... |
| m | OFF | — | CPU CLOCK, MEMORY, OTHERS | — | 2 |

PRINTED-CIRCUIT-BOARD NETWORK TABLE (3110)

| NO. (3111) | MAC ADDRESS (3112) | IP ADDRESS (3113) | GROUP (3114) |
|---|---|---|---|
| 1 | 00:00:99:00:00:73 | 200.000.000.100 | 1 |
| 2 | 00:00:99:00:00:35 | 200.000.000.101 | 1 |
| 3 | 00:00:99:00:00:36 | 200.000.000.102 | 1 |
| n | 00:00:99:00:00:67 | | 1 |

FIG.31

CONVERSION ADDRESS TABLE — 3210

| IP ADDRESS A | PORT NO. | IP ADDRESS B | PORT NO. |
|---|---|---|---|
| 200.000.100.100 | 1 | 000.000.000.000 | 0 |
| 200.000.100.100 | 100 | 192.168.000.010 | 8000 |
| 200.000.100.100 | 101 | 000.000.000.000 | 0 |
| 200.000.100.100 | 1000 | 192.168.100.001 | 3000 |
| 200.000.100.100 | 1001 | 000.000.000.000 | 0 |
| 200.000.100.100 | n | 000.000.000.000 | 0 |

3211 / 3212 / 3213 / 3214 / 3215

COMPUTER SYSTEM FOR SELECTING A USEABLE COMPUTER BOARD TO POWER ON AND ACCESSING CORRESPONDING STORAGE BASED ON TERMINAL REQUEST THAT INCLUDES USER INFORMATION

INCORPORATION BY REFERENCE

This application claims priority based on a Japanese patent application, No. 2005-281083 filed on Sep. 28, 2005, the entire contents of which are incorporated herein by reference.

The present invention relates to a computer system in which a storage device such as a hard disk device is used by a user over a network, and more particularly to a technique by which the computer system is collectively managed, and the user uses the computer system from a device coupled over the network.

In recent years, the price reductions of a personal computer (hereinafter referred to as "PC") and network devices have been advanced, and business enterprises that distribute devices such as the PCs to most of employees for executing business are being increased in number. As the business enterprises purchase an increased number of PCs with the price reduction in the PC, the number of PCs that must be subjected to maintenance operation by a device manager within the business enterprise is increased in proportion. In the present specification, the maintenance operation is directed to, for example, version up or bug fix of an operating system (hereinafter referred to as "OS") or a business application, a response to a hardware failure, antivirus or safeguard against virus. Since the management costs expended for the maintenance operation are very high, the management costs become more immense in proportion as the number of employees who use the PCs is more increased.

As a manner for reducing the management costs, there is a system operating method that is called "server client system". In the system, main program or data which is used by the user is stored in a computer that is called "server", to reduce data that is stored in a computer (hereinafter also referred to as "client") operated directly by the user, which is called, for example, "thin client" (for example, refer to Japanese Patent Laid-Open No. 2004-094411).

In the server client system, because an operation process and the storage of data are mainly executed by the server, there is reduced the necessity or frequency of executing the version up or bug fix of the OS or the application used for business, antivirus or the safeguard against virus by a client, individually. For that reason, the total management costs can be reduced.

Also, as a method of easing the enlargement of the server scale with an increase in the number of users who use the above server, there is a method that is called "blade server". This constitutes a computer in which a CPU and a memory are mounted on a single printed circuit board which is called "blade style computer". A single blade style computer is used as a single server, and when the number of users increases, the number of blade style computers is accordingly increased to disperse a load.

SUMMARY OF THE INVENTION

In the above server client system, all of the users who use the server through the clients are required to commonly use the same application program on the server, and it is difficult to constitute different applications or environments on the same server by the individual users. For that reason, it is usual to execute the applications that must be processed by each of the users at the client side that is used by each of the users. There is no case in which the applications that must be processed by each of the users are not installed at the server side. Thus, the client server system is improper in executing the operation under the environments that are changed by the users, individually. Accordingly, there is no advantage except that the data is stored in a storage device at the server side, and the backup management is collectively managed, if anywhere. Also, in the server client system, the client that is always used by each of the users is fixed, and it is difficult to recreate the environments of a computer which the user wishes to use at a different location (different client).

The present invention provides a computer system which can always execute processing under the same environments no matter where the client used by the user is, and no matter what device is used.

The above and other novel features of the present invention will become apparent from the description of the present specification and the attached drawings.

The representative summary of the present invention disclosed herein will be described below.

That is, a computer system according to the present invention is structured in such a manner that a printed circuit board assembly called a blade style computer, in which a CPU, a memory and the like are mounted on a printed circuit board, is used for a user, and further a plurality of blade style computers are coupled to a storage device having a storage area which is allocated to each of a plurality of users over a network.

One user uses an arbitrary client (hereinafter, also referred to as "terminal device"), and uses a single blade style computer as a computer which allows each user to freely set environments and applications.

More specifically, the blade style computer that is used by the user accesses OS or data by using the storage area, which has been allocated to the user, of the storage device over the network.

For achieving the above access, the blade style computers are coupled to the storage device through not a hard disk dedicate interface but a network communication interface.

The blade style computer includes at least a first network interface through which the terminal used by a user mainly couples to the blade style computer (computer printed circuit board) and at least a second network interface for accessing the storage device. As described above, a communication function used when accessing the storage device is separated from a communication function used when accessing from the terminal by the user to thereby lessen the communication competition. Notable effects can be seen especially in the case where plural users execute processing in parallel, that is, in the case where the access gained by a user to the storage device coincides with the access gained by another user from the terminal.

Any of the plural blade style computers which should be used by the user is selected on the basis of a given rule by the management computer, and notified the user of. The management computer manages information on a correspondence of a storage area of the storage device to the user who uses the storage area, and notifies the blade style computers which are used by the user of the information on the storage area corresponding to the user.

According to the present invention, the same OS or application can be executed under the same setting situation even if the connection situation is changed, not depending on the client that is used by the user.

According to the present invention, there can be provided a computer system that improves the convenience of the user and reduces the device costs and the management costs of the manager.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 exemplifies a table;

FIG. 4 exemplifies an inactive user list;

FIG. 5 exemplifies a region list used by users;

FIG. 24 exemplifies an access management list;

FIG. 27 exemplifies a table;

FIG. 28 exemplifies a printed-circuit-board network table;

FIG. 31 exemplifies a conversion address table;

DETAILED DESCRIPTION OF THE EMBODIMENTS

Figure 1:
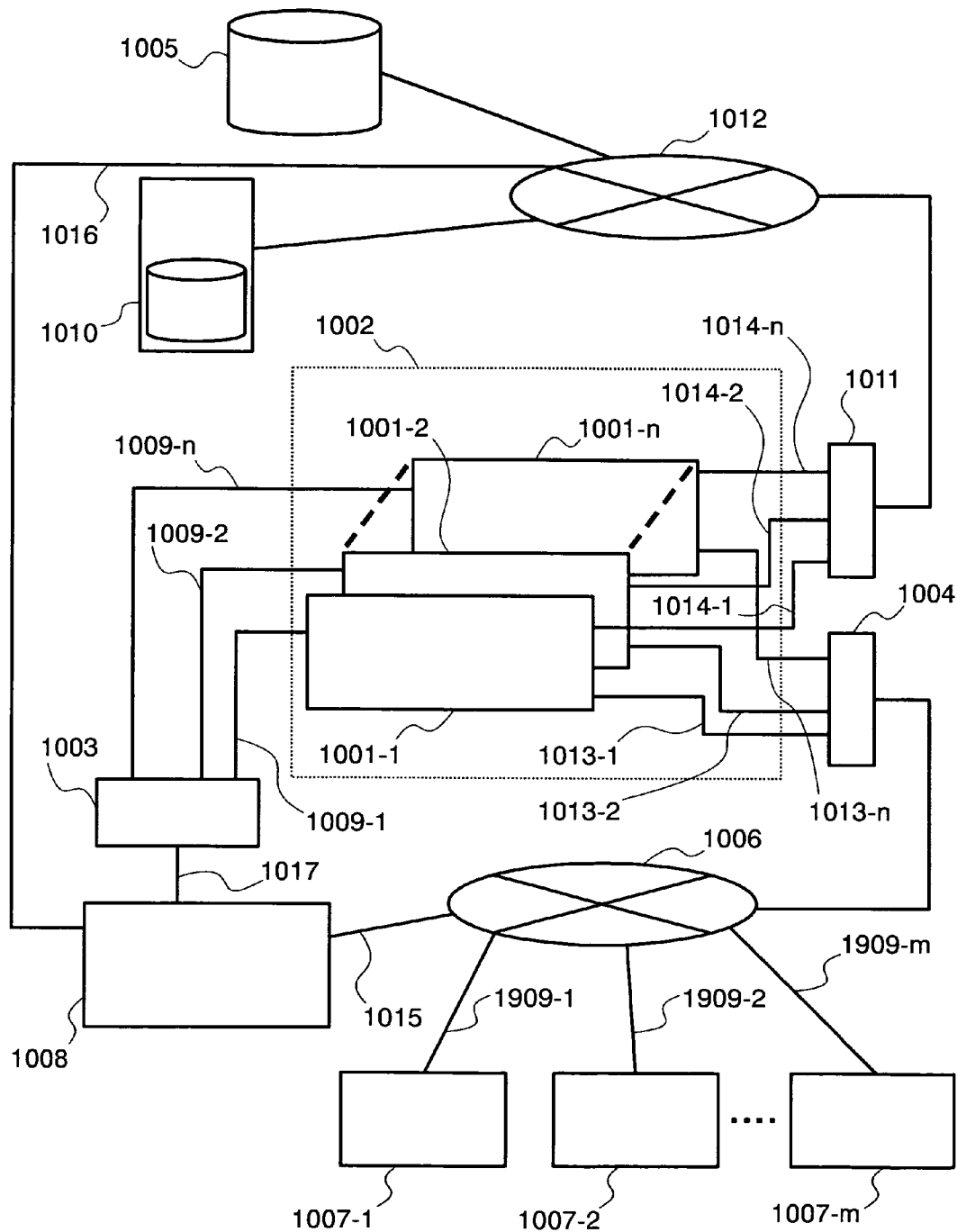
FIG. 1 exemplifies an entire structural block diagram of a first embodiment.

Now, a description will be given in more detail of preferred embodiments of the present invention with reference to the accompanying drawings. In the drawings, the same reference numerals denote identical structural elements, and therefore their duplicate detailed description will be omitted for convenience of description.

First Embodiment

FIG. 1 is a diagram showing an example of a computer system according to a first embodiment of the present invention.

A user uses one arbitrary terminal among terminal devices (1007-1 to 1007-*m*). The terminal devices 1007 are coupled to a first network 1006 through network wirings (1909-1 to 1909-*m*), respectively. The first network 1006 is also coupled with a management computer 1008 through a communication line 1015.

Figure 34:
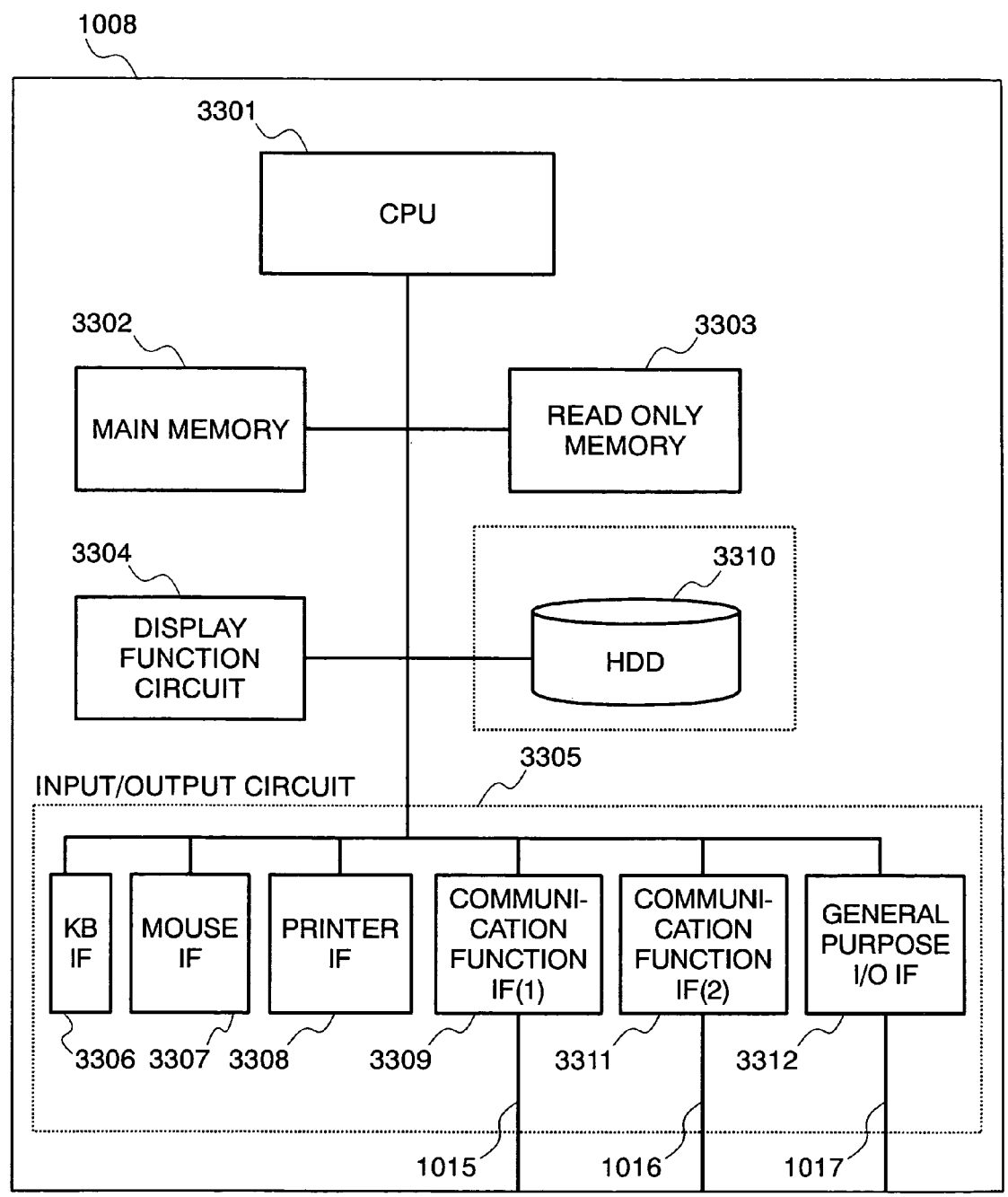
FIG. 34 exemplifies a structural block diagram of a management computer.

The management computer 1008 includes at least two communication function interfaces 3309 and 3311 as shown in the structural diagram of FIG. 34. The first communication function interface 3309 is coupled to a first hub device 1004.

As a storage device having a storage area that is allocated to each of a plurality of users, which is a characteristic constituent element in the following respective embodiments, a hard disk device 1005 is utilized. The hard disk device 1005 is coupled to a second hub device 1011 via a second network 1012. The second network 1012 is coupled to the second communication function interface 3311 of the management computer 1008. Each of computer printed circuit boards (1001-1 to 1001-*n*) includes two communication function interfaces, each of which is coupled to the first hub device 1004 and the second hub device 1011, respectively. In the case where more than two communication function interfaces are provided, each of the communication function interfaces is coupled to the corresponding hub device.

The user selects one or plural computer printed circuit boards from a computer device 1002 consisting of n computer-printed-circuit-boards (1001-1 to 1001-*n*: corresponding to the blade style computers) for use. The management computer 1008 selects any of the computer printed circuit boards 1001 according to a predetermined rule, and then instructs the selected computer printed circuit board to the terminal devices 1007. Alternatively, it is possible that the user per se directly designates any of the computer printed circuit boards to be used to the management computer 1008.

In order to start the computer printed circuit board 1001 that has been selected according to the rule or the instruction, the management computer 1008 instructs a power control mechanism 1003 to start the computer printed circuit board 1001 through a general purpose I/O interface and a control line 1017. The power control mechanism 1003 supplies a power to a power line (1009-1 to 1009-*n*) corresponding to the instructed computer printed circuit board 1001 to start the computer printed circuit board 1001. For example, in the case where the computer printed circuit board 1001-1 is selected, the power control mechanism 1003 supplies a power to a power line 1009-1. Further, the management computer 1008 per se includes a power switch that is operated by a manager for power on/off.

The above rule may be defined as follows: for example, the user selects a computer printed circuit board which most matches a condition (performance, memory capacity) that is designated in advance, selects a computer printed circuit board that is lower in the frequency of use, saves the use history of the computer printed circuit board by the user and preferentially selects a computer printed circuit board which has been used by the user with reference to the use history, selects the computer printed circuit board which is lower in frequency of failure occurrence, selects the computer printed circuit board at random, and selects a computer printed circuit board that is the highest in performance from the computer printed circuit boards that have not yet been used. Also, the computer printed circuit board may be selected in each of groups such as a department or a section to which the user belongs. For example, a top official computer printed circuit board belongs to a blade-style-computer group of another group, or if a shared server of the department is provided, the computer printed circuit board is selected from a blade-style-computer group that can access the server. In this case, information on the respective groups (information on the users who belong to the respective groups) is managed by the management computer 1008 with the use of a table. In addition, it is possible that dates of manufacture of the computer printed circuit boards are managed, and the oldest (or newest) computer printed circuit board is selected from unused computer printed circuit boards.

Figure 2:
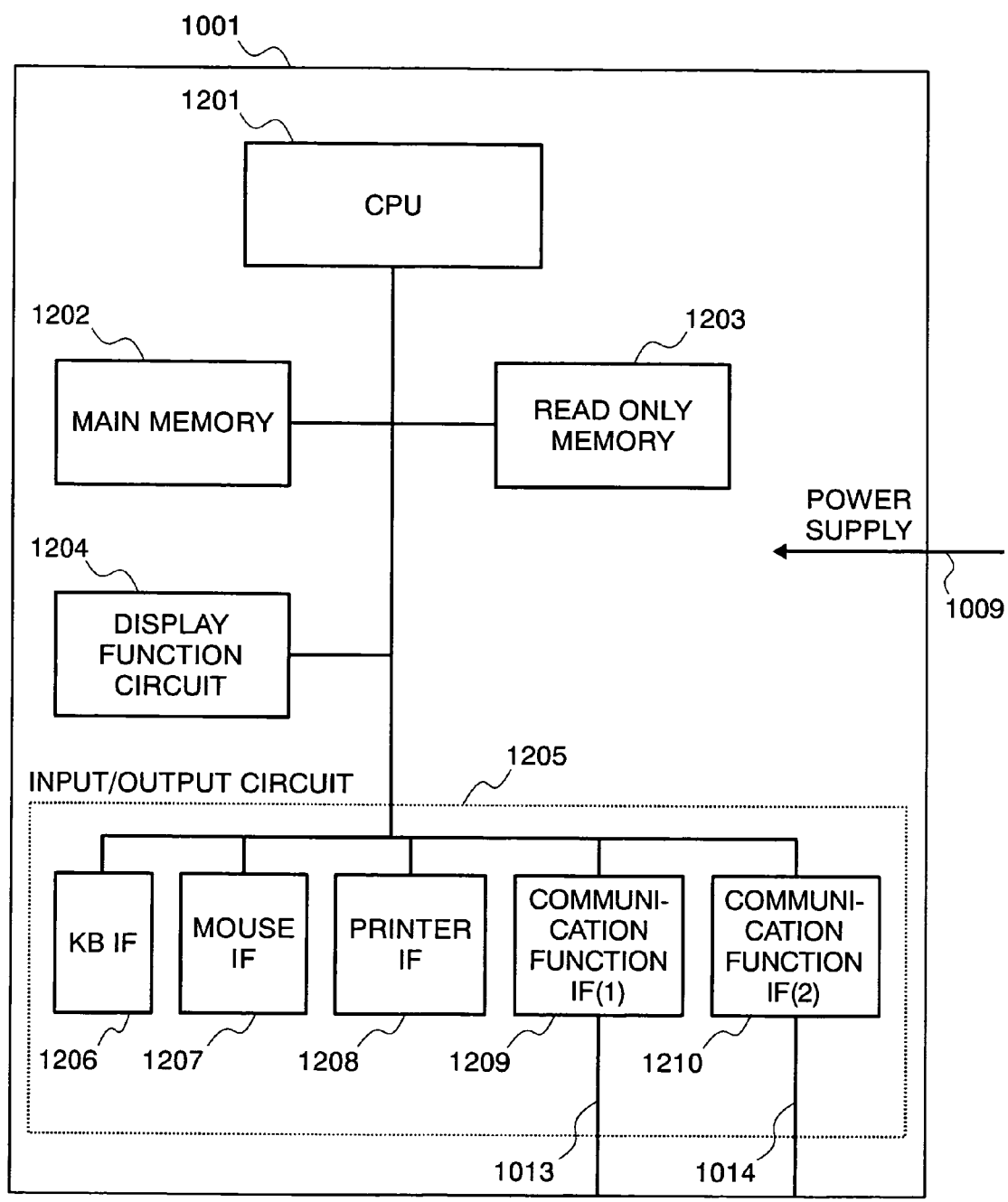
FIG. 2 exemplifies a structural block diagram of a printed circuit board assembly (in the following, it is abbreviated as PCBA) according to the first embodiment.

FIG. 2 is a diagram showing one structural example of the computer printed circuit board 1001. The computer printed circuit board 1001 includes a CPU 1201, a main memory 1202, a read only memory 1203, a display function circuit 1204, and an input/output circuit 1205, which are mutually coupled to each other through a communication line such as a bus (hereinafter, referred to as a bus). Also, the input/output circuit 1205 includes a keyboard interface 1206, a mouse interface 1207, a printer interface 1208, a first communication function interface 1209, and a second communication function interface 1210. However, a hard disk device that is equipped in an ordinary computer is not included in the computer printed circuit board 1001.

When an electric power is supplied to the power line 1009 corresponding to the computer printed circuit board 1001, the CPU 1201 reads initial start software (BIOS: basic input/output system) from the read only memory 1203 to execute the software. Thereafter, the operation of starting the OS per se is executed according to an instruction from the BIOS. In this situation, the software body of the OS is read from the hard disk device 1005 through the second communication function interface 1210. First communication lines 1013 for the first communication function interfaces 1209 of the respective printed circuit boards are collected by the first hub device 1004, and then coupled to the first network 1006. The terminal devices (1007-1 to 1007-m) and the like are coupled to the first network 1006. Second communication lines 1014 for the second communication function interfaces 1210 are collected by the second hub device 1011, and then coupled to the second network 1012 that is coupled to the hard disk device 1005.

Figure 6:
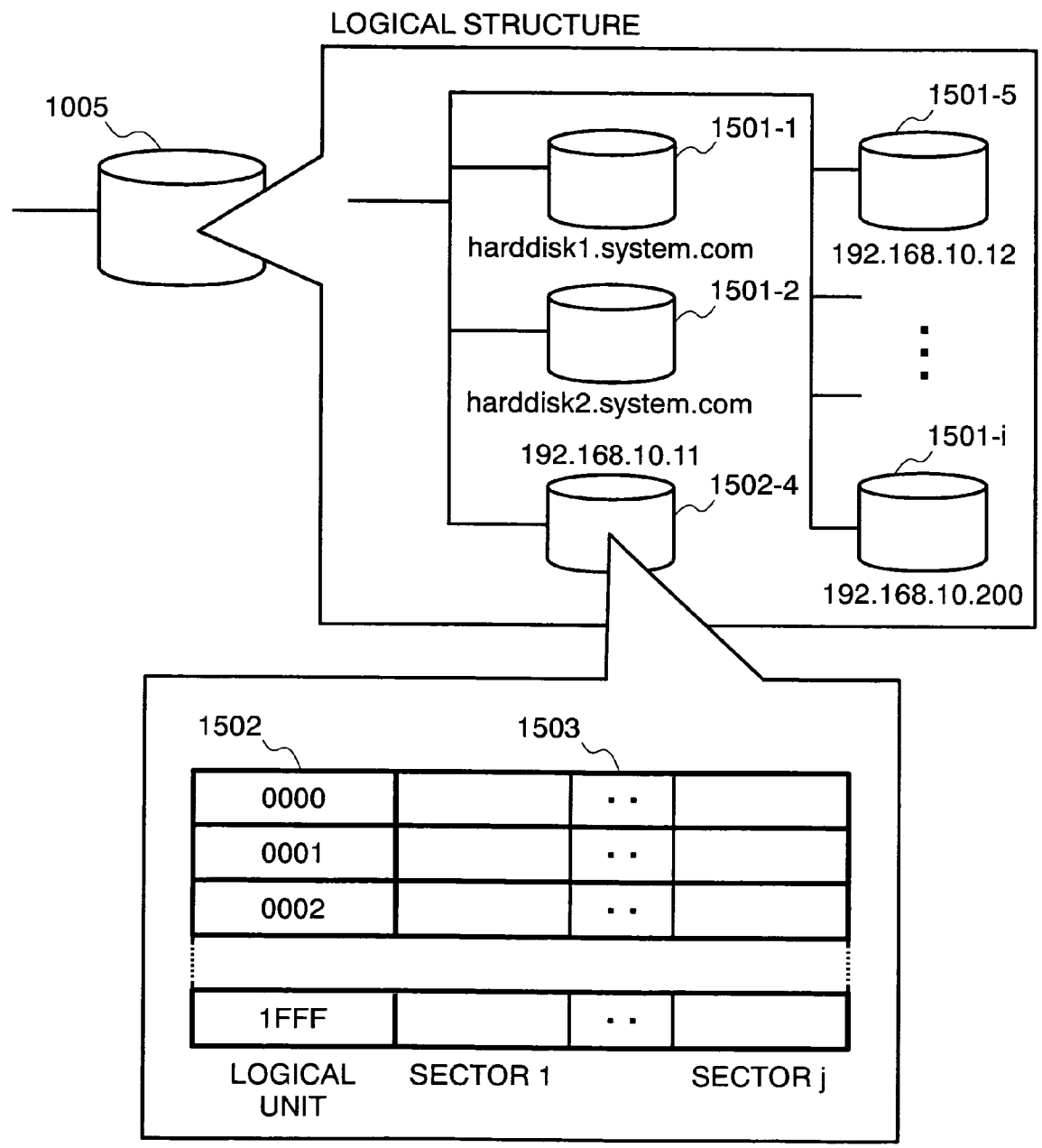
FIG. 6 exemplifies a logical structure of a hard disk device.

In the following respective embodiments, since the second communication function interface 1210 connecting to the hard disk device 1005 and the first communication function interface 1209 connecting to the terminal device are separately provided, the competition between a process of reading an OS from the hard disk device 1005 and a process of accessing a computer printed circuit board from the terminal can be prevented. Notable effects can be obtained in terms of a processing time of launching and the reduction of time required for responding to the terminal, for example, when a process of launching computer printed circuit boards by a plurality of users coincides with accesses from the terminals, FIG. 6 is a diagram showing a structural example of the hard disk device 1005. The hard disk device 1005 may be made up of one disk device or an aggregative hard disk device (for example, RAID device) that combines plural disk devices together. In FIG. 6, the hard disk device 1005 is formed of the aggregative disk device which includes independent hard disk devices (1501-1 to 1501-i) and a control unit that controls those hard disk devices (1501-1 to 1501-i). The storage area of the respective hard disk devices 1501 is divided on the basis of a logical unit No. 1502, and each storage area is allocated to the user. The storage area of the respective logical units is divided into sectors 1 to j (1503).

Figure 11:
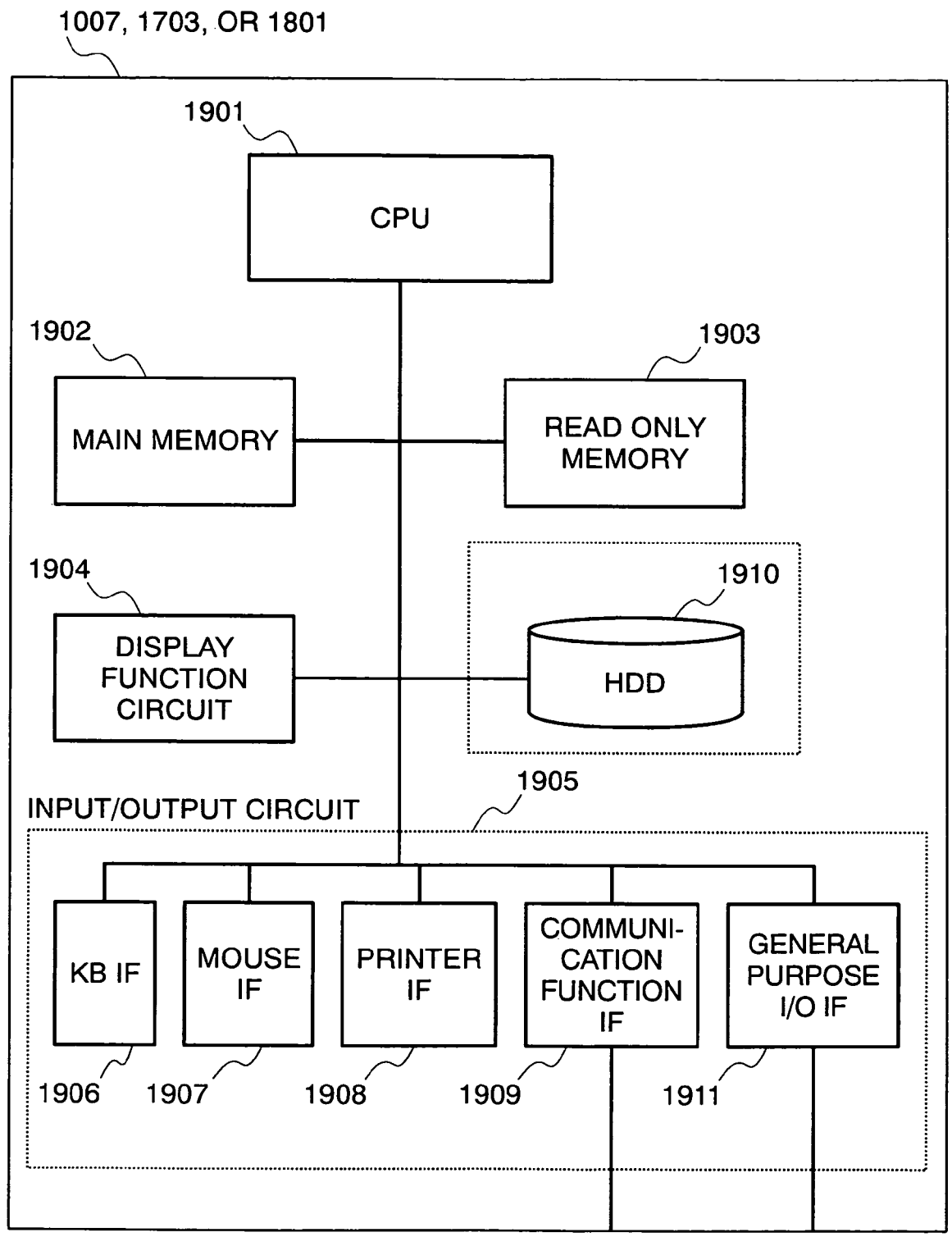
FIG. 11 exemplifies a structural block diagram of a terminal device and a remote terminal device.

FIG. 11 is a diagram showing a structural example of the terminal device 1007. The terminal device 1007 has a CPU 1901, a main memory 1902, a read only memory 1903, a display function circuit 1904, and an input/output circuit 1905, which are mutually coupled to each other via a communication line such as a bus (hereinafter, referred to as a bus). Also, the input/output circuit 1905 includes a keyboard interface 1906, a mouse interface 1907, a printer interface 1908, a communication function IF 1909, and a general purpose I/O interface 1911. In addition, the terminal device 1007 may include a hard disk device 1910 which is not built in the computer printed circuit board 1001. As a matter of course, the terminal device 1007 may not include the hard disk device 1910. Start of the hard disk device 1910 may be executed from the read only memory 1903 or an external storage device through the general purpose I/O interface 1911.

Other devices (management computer 1008, etc.) may be formed of an ordinary computer which includes an HDD 3310, a KB IF 3306, a mouse interface 3307, a general purpose I/O and the like, as shown in FIG. 34 which illustrates a structural example of the system.

FIG. 3 is a diagram showing an example of a table 1301 that is stored in the management computer 1008. In the table, a power state 1303, a user name 1304 that uses the computer printed circuit board, attribution information 1305 of the printed circuit board, and a running state 1306 are stored by the number of computer printed circuit boards 1001 provided in the computer device 1002 in correspondence with No. 1302 of the computer printed circuit board 1001. The "suspend" described in the running state 1306 means a suspended mode. The suspended mode is directed to a mode in which the operation clock of the CPU 1201 is lowered, or a refresh rate of the main memory 1202 is delayed to reduce the power consumption of the printed circuit board per se. In the suspended mode, the user cannot execute the usual business application, but can resume the process in the computer printed circuit board 1001 simpler than a case in which a power is perfectly shut off.

As the attribution information 1305 on the printed circuit board, there are stored the performance or specification of the CPU 1201, the memories 1202 and 1203, and the display function circuit 1204, a settable range of set numeric values, and setting enable/disable information of the power management, which are setting information provided by the computer printed circuit board 1001.

In the example of FIG. 3, the power of the computer printed circuit board 1001-1 of No. 1 is on-state and the user is Ichiro, and there are recorded attribution information describing the features of the printed circuit board, and the running state is on. In the printed circuit board of No. 2, the power is off, but Taro of the user name occupies the computer printed circuit board.

In the present specification, the "occupy" represents a state (hereinafter referred to as "hibernation") in which the user stops the use of the computer printed circuit board, but does not waive the right to use the computer printed circuit board. Whether the user hibernates the use of a certain computer printed circuit board 1001, or not, is recorded in an inactive user list 1311 as shown in FIG. 4. In general, there is a computer that can be set to a hibernation state (or "hibernation mode") when the computer is not used for energy saving. The hibernation state is a state in which all of information on the running state of the computer is written in a nonvolatile storage medium such as a hard disk drive, and a power supply of the computer printed circuit board per se is turned off. In the hibernation state, the power consumption can be reduced more than the above-mentioned suspended mode, but it takes much time to resume the processing in the computer printed circuit board.

Accordingly, even if the power supply of the computer printed circuit board 1001 is off, it is necessary to discriminate whether the computer printed circuit board 1001 is in a hibernation state, or in a state where the computer printed circuit board is not merely used. Therefore, the management computer 1008 manages the presence or absence of the hibernation of the computer printed circuit board with reference to the above-mentioned inactive user list 1311. In the inactive user list 1311 are recorded a user name 1312, an applied printed-circuit-board No. 1313 in the hibernation state, and an attribute information 1314 of the printed circuit board.

When the management computer 1008 allocates the computer printed circuit board 1001 to a new user, the management computer 1008 selects the computer printed circuit board 1001 a power of which is off from the list 1301. In this situation, the management computer 1008 confirms from the inactive user list 1311 whether the computer printed circuit board 1001 whose power is off is in hibernation, or not. Then, the management computer 1008 allocates the computer printed circuit board that is not in hibernation, that is, which is not used by any user to the new user.

On the other hand, when the user who is in hibernation requests the management computer 1008 to restart the computer printed circuit board which is in hibernation, the management computer 1008 confirms that there is a user name of the user who is a requester in the inactive user list 1311. Then, the management computer 1008 specifies the computer printed circuit board 1001 that has been used by the user in correspondence with the user name, and instructs the restart to the computer device 1002. When the computer printed circuit board that had been used up to that time cannot be used (is failed), the management computer 1008 confirms the contents of the attribute information 1314 which has been registered in the inactive user list 1311, and allocates another computer printed circuit board 1001 whose power is off and which has the same attribute information to restart.

The computer printed circuit board 1001 may be allocated in correspondence with a user identifier which is predetermined in each of the users.

In the case where another computer printed circuit board having the same attribute information is not allocated to the user, the management computer 1008 allocates an operable computer printed circuit board that is the nearest to the specification to the user. Specifically, the management computer 1008 first refers to the performance of the CPU among the attribute information, and then refers to the memory capacity to compare the specifications. Then, the management computer 1008 selects a computer printed circuit board that is close to the specification of the computer printed circuit board that cannot be restarted. As a result of allocation, in the case where the allocated computer printed circuit board does not normally operate due to a difference of parts such as the CPU, the memory and the network interface on the computer printed circuit board, the management computer 1008 holds the contents of the user list 1311 in a pre-allocated state. Then, the management computer 1008 interrupts the allocating operation until another printed circuit board having the same attribute information can be allocated to restart. The interrupt during the allocating operation is notified the user of, and the user selectively continuously waits for a chance at which the allocating operation can be executed, or cancels the request per se.

Figure 14:
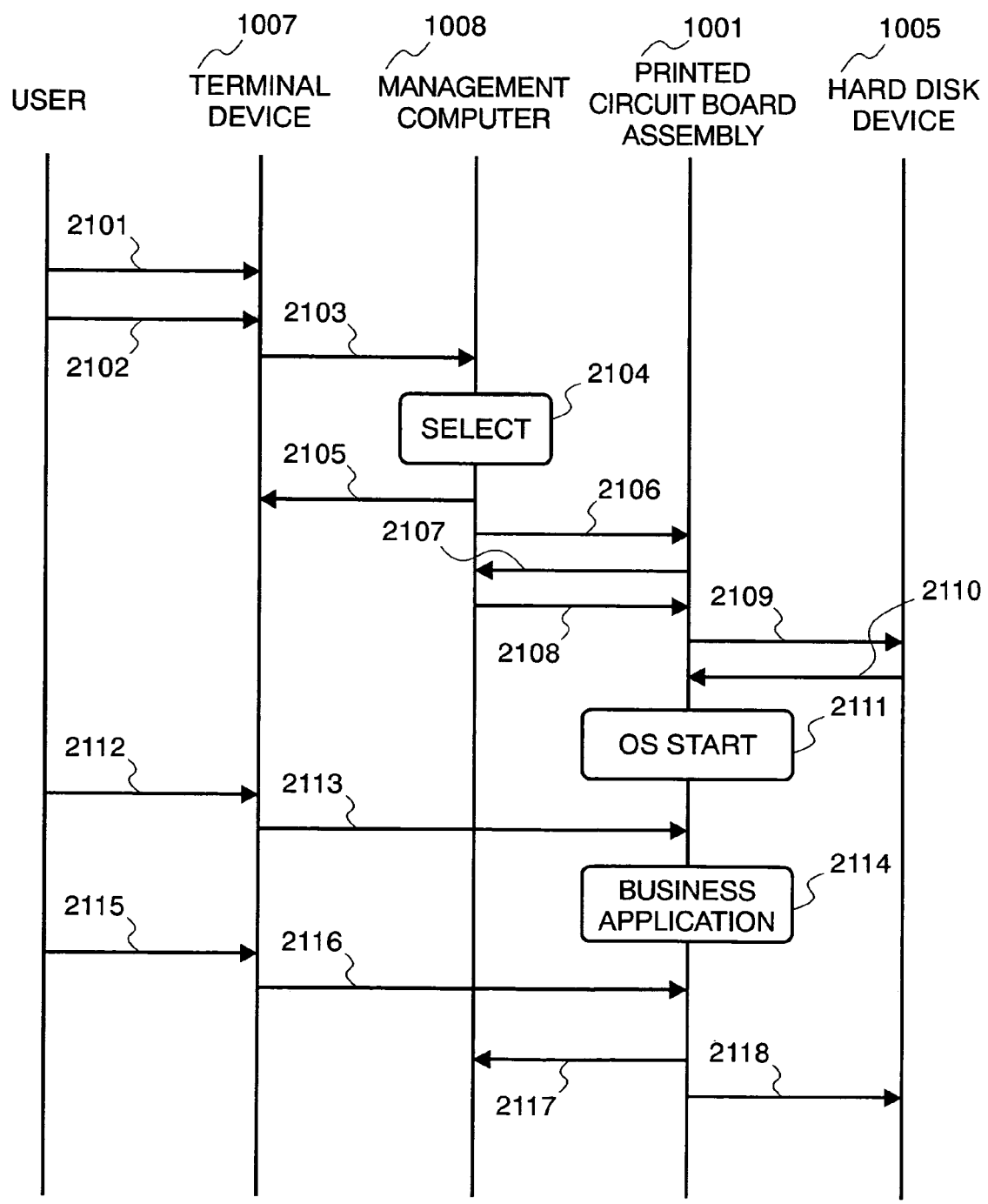
FIG. 14 exemplifies a basic start process flowchart.

FIG. 14 is a flowchart showing a process until starting the computer printed circuit board 1001 in the computer system according to this embodiment. First, the user starts the terminal device 1007 (Step 2101). Thereafter, the user instructs the terminal device 1007 to start the computer printed circuit board 1001 (Step 2102). Upon receiving the instruction, the terminal device 1007 instructs the management computer 1008 to start the computer printed circuit board 1001 (Step 2103). Upon receiving the instruction, the management computer 1008 executes a selecting process 2104. The selecting process 2104 selects the computer printed circuit board 1001 to be used by the user on the basis of the predetermined rule and the information of the table 1301 and the inactive user list 1311.

After completion of the selecting process 2104, the management computer 1008 notifies the terminal device 1007 of the information on the determined computer printed circuit board 1001. In this situation, the management computer 1008 rewrites the running information in the table 1301 from not-in-use to in-use (specifically, information on the user who uses the computer printed circuit board is registered) for the selected computer printed circuit board (Step 2105).

Thereafter, the management computer 1008 instructs the power control mechanism 1003 to turn on the power supply with respect to the selected computer printed circuit board 1001. The power control mechanism 1003 supplies a power to the power line 1009 corresponding to the selected computer printed circuit board 1001 (Step 2106). The computer printed circuit board 1001 whose power is turned on requests the management computer 1008 to send out the BIOS that is executed by the CPU 1201 in order to read out the OS over the network (Step 2107).

The management computer 1008 that receives the send-out request sends out the read-out BIOS to the computer printed circuit board 1001 according to that request. In this situation, the management computer 1008 notifies the computer printed circuit board 1001 of, together with the read-out BIOS, the information on the storage area of the hard disk device 1005 which is used by the user who starts the computer printed circuit board 1001 which receives the BIOS. In this situation, the management computer 1008 uses a user used region list 1401 shown in FIG. 5.

The user used region list 1401 is information indicative of a correspondence between the user who uses the computer system and the storage area provided in the hard disk device 1005 which is used by the user. Specifically, information on the designation that is allocated to the hard disk device 1005 which is used by the user and logical unit No. indicative of the location of the storage area that is allocated to the user within the hard disk device 1005 is stored in each of the users.

The management computer 1008 reads out a hard disk designation 1403 in which the data of the user exists with reference to a user name 1402, and also reads out a logical unit No. 1404 within the hard disk device 1005. The management computer 1008 sends out the hard disk designation 1403 and the logical unit No. 1404 to the computer printed circuit board 1001 together with the read-out BIOS (Step 2108).

The computer printed circuit board 1001 that has received the BIOS from the management computer 1008 executes the BIOS, and instructs the hard disk device 1005 over the network to read out the data (OS in this example) which is stored at an address indicated by the received logical unit No. of the hard disk device 1005 (Step 2109).

The hard disk device 1005 that has received the instruction sends out the OS that is stored in the storage area designated by the user to the computer printed circuit board 1001 according to the request (Step 2110).

The computer printed circuit board that has received the OS executes the start process of the OS (Step 2111). When the computer printed circuit board 1001 requests the hard disk device 1005 to provide the data at the time of starting the computer printed circuit board 1001, the computer printed circuit board 1001 locates an area that is occupied by the user from the user used legion list 1401 within the management computer 1008. The address and the size which are occupied by each of the users are described in the area. When the OS starts, and a situation in which the computer printed circuit board 1001 can be used by the business application is completed, the user executes the business application start process through the terminal device 1007 (Step 2112).

In the case where dynamic allocation is utilized as a method of allocating a network address (for example, IP address) to a computer printed circuit board 1001, the network address of the computer printed circuit board 1001 is not determined at the time of executing the selecting process 2104 by the management computer 1008, but the network address is determined in the course of the start process 2111 of the OS. In that case, the management computer 1008 executes the process of notifying the terminal device 1007 of the network address of the selected computer printed circuit board 1001 in the step 2105 after the network address of the computer printed circuit board 1001 is determined (after completion of the start process 2111 of the OS). Even in the case where fixed allocation is utilized as a method of allocating a network address (for example, IP address) to a computer printed circuit board 1001, the process of notifying the terminal device 1007 of the network address of the selected computer printed circuit board 1001 may be executed after the start process of the OS (step 2111). The modification example of the procedure of notifying of the determined network address is not limited to this embodiment, but can be similarly applied to the following respective embodiments.

The terminal device 1007 instructs the starting computer printed circuit board 1001 to execute the business application start (Step 2113). Upon receiving the instruction, the computer printed circuit board 1001 executes the business application (Step 2114). When the user completes the processing of the computer printed circuit board 1001, the user gives the completion instruction to the terminal device 1007 (Step 2115). The terminal device 1007 that has received the completion instruction instructs the computer printed circuit board 1001 to complete the process (Step 2116). The computer printed circuit board 1001 that has received the completion instruction starts the completion process, and also notifies the management computer 1008 of a process completion report. The management computer 1008 that has received the notification updates the running information of the table 1301 from in-use to not-in-use with respect to the computer printed circuit board 1001 that has transmitted the notification (Step 2117). On the other hand, the computer printed circuit board 1001 that has started the completion process rewrites the data that has been used during the business application and stored in the own main memory 1202 back to the storage area of the hard disk device 1005 which is occupied by the user. After rewriting back, the computer printed circuit board 1001 stops itself. In this situation, the computer printed circuit board 1001 instructs the power control mechanism 1003 to stop the power supply (Step 2118).

Figure 15:
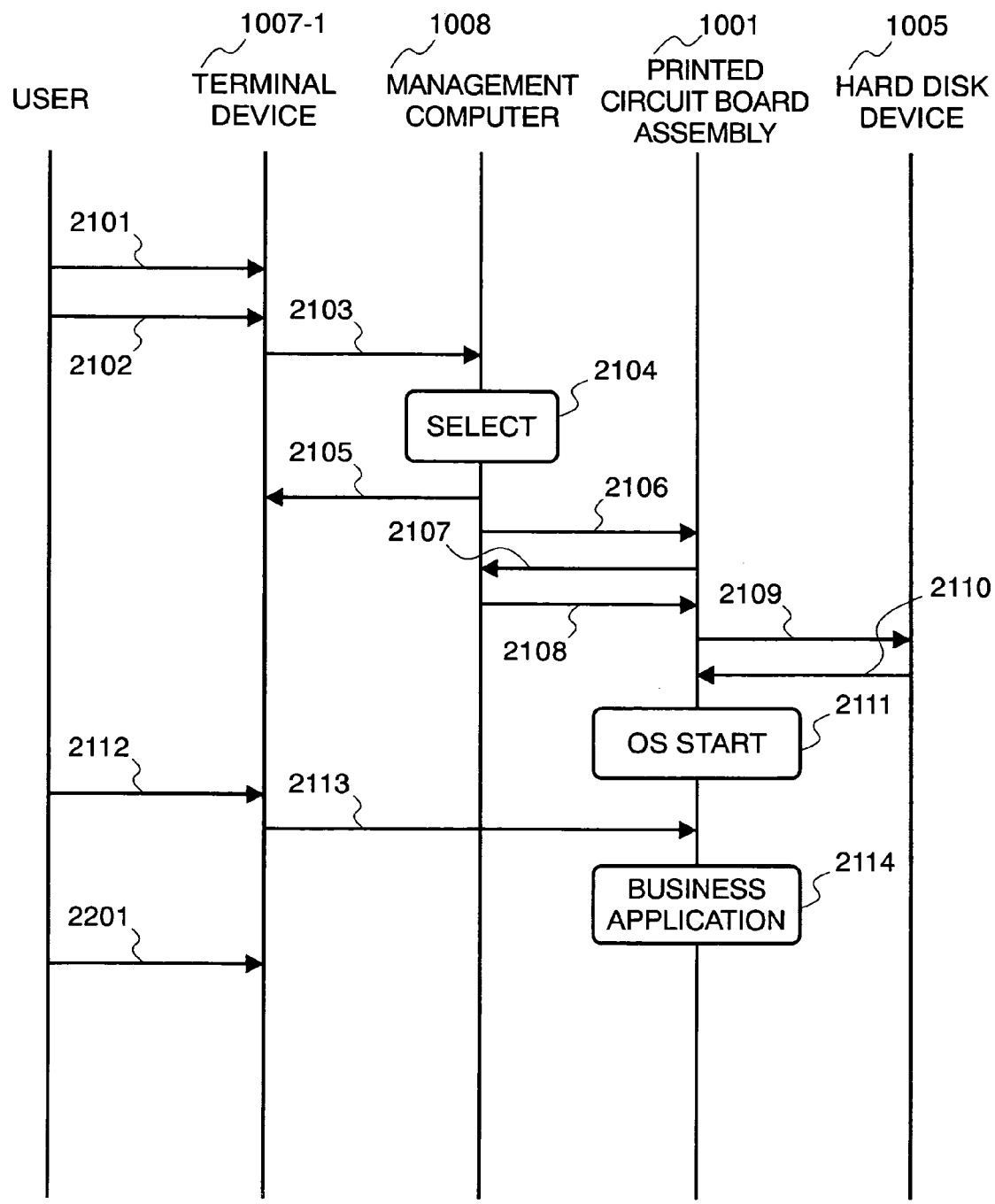
FIG. 15 exemplifies a process flowchart of stopping the terminal device.

FIG. 15 is a diagram showing a procedure example in the case where the user gives an instruction to stop the terminal device 1007-1 (Step 2201) in a state where the computer printed circuit board 1001 executes the business application (Step 2114) in a procedure shown in FIG. 14. In this case, since the stop of the terminal device 1007 does not affect the process of the computer printed circuit board 1001, the computer printed circuit board 1001 can continue the business application 2114. Then, in the case where the same user uses the computer device again by using another terminal device 1007, the management computer 1008 selects the computer printed circuit board 1001 that has been already in use, and notifies the terminal device 1007 that is used by the user of the information on the computer printed circuit board 1001 that is in use to resume the use.

Figure 16:
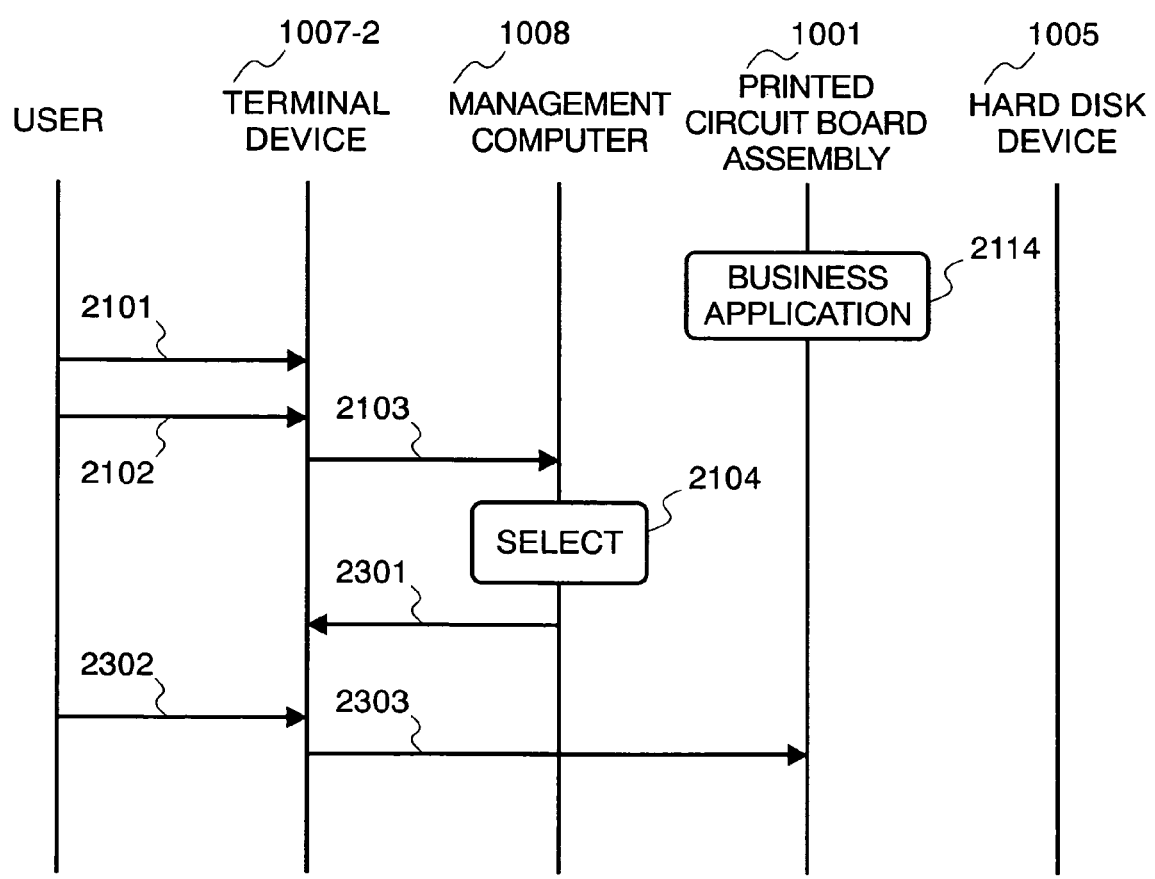
FIG. 16 exemplifies a process flowchart of resuming the terminal device.

FIG. 16 is a diagram showing the details of the procedure example in the case where the user resumes the process in FIG. 15. The user starts another terminal device 1007-2, and requests the management computer 1008 to send the information on the computer printed circuit board 1001 (Step 2101). The management computer 1008 that has received the request selects the computer printed circuit board 1001. In this situation, since the computer printed circuit board that is used by the user has been already registered in the table 1301, the management computer 1008 selects the computer printed circuit board 1001 (Step 2104). Then, the management computer 1008 notifies the terminal device 1007-2 of the information on the computer printed circuit board that has been already used (Step 2301). Upon receiving this notification, the user instructs the new terminal device 1007-2 to execute the business application (Step 2302), and gives a process instruction to the computer printed circuit board 1001 that had been used before from the terminal device 1007-2 (Step 2303) so as to continue the business.

Figure 17:
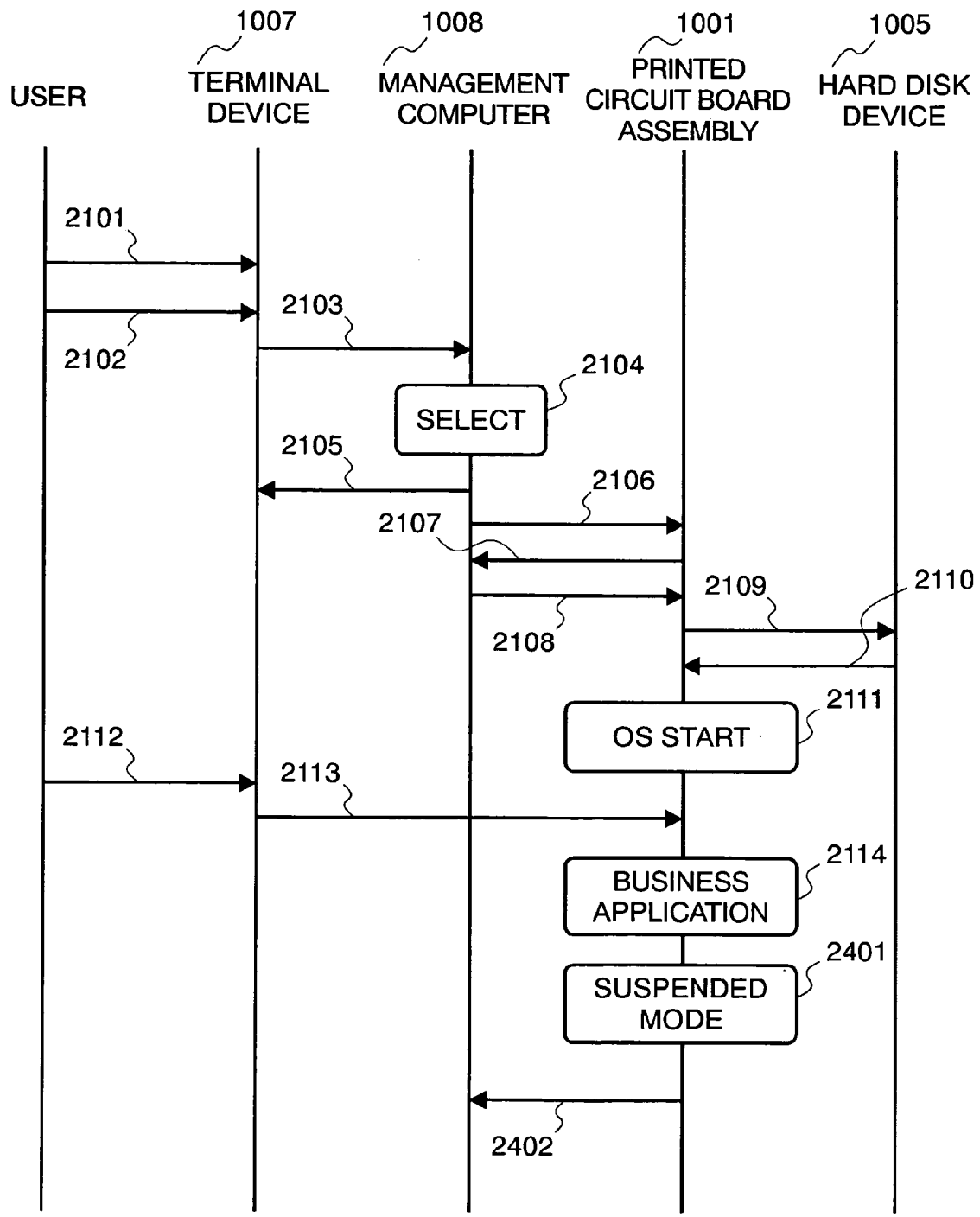
FIG. 17 exemplifies a process flowchart of setting a PCBA to a suspended mode.

FIG. 17 is a diagram showing a procedure example in the case where the computer printed circuit board 1001 moves from the present mode to the suspended mode while executing the business application 2114. In the case where the computer printed circuit board 1001 enters the suspended mode, the computer printed circuit board 1001 executes the storage process (Step 2401) of data necessary for the process to enter the suspended mode on the main memory 1202. Thereafter, the computer printed circuit board 1001 reports the entry of the suspended mode to the management computer 1008 (Step 2402). The reported management computer 1008 rewrites the information on the running state in the table 1301 corresponding to the reporting computer printed circuit board 1001 to "suspend". The triggers to enter the suspended mode have various cases such as a case where the CPU 1201 is not used for a given period of time.

Figure 18:
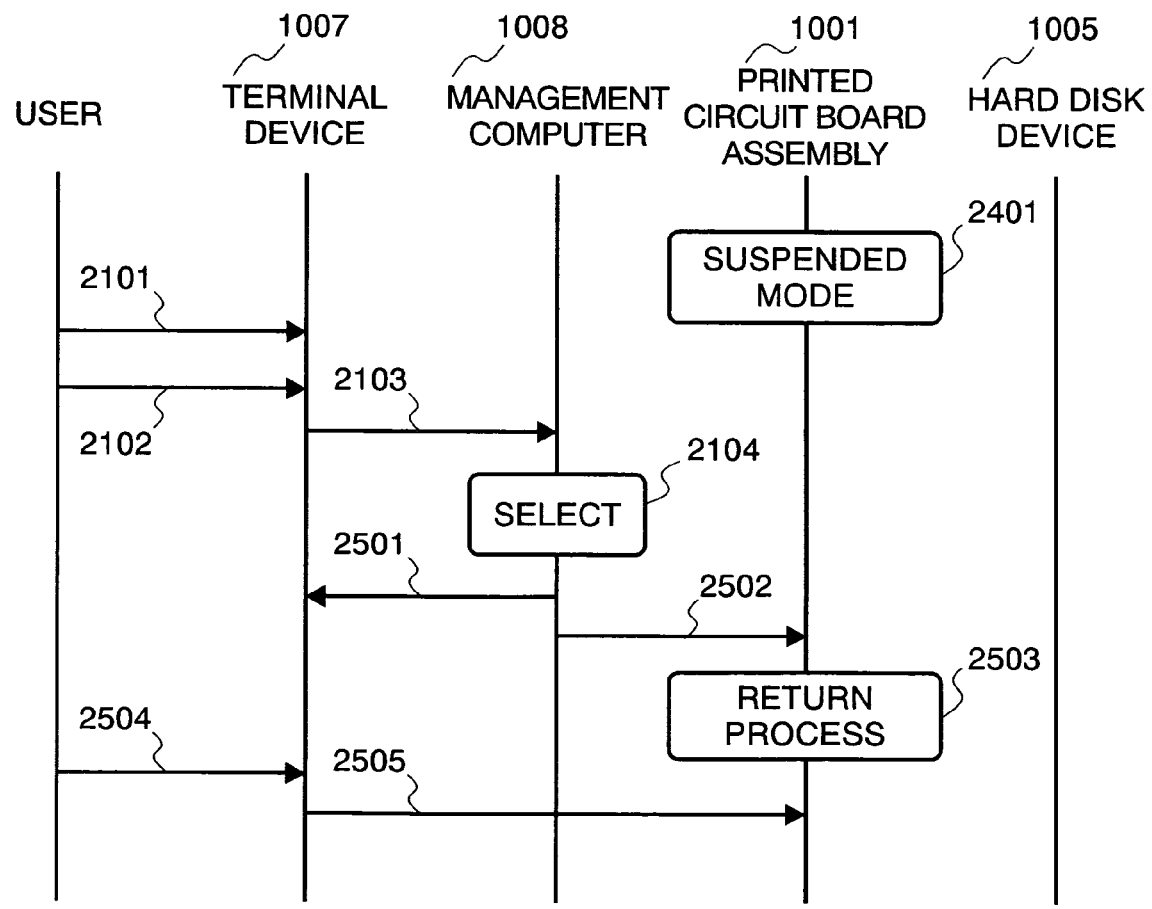
FIG. 18 exemplifies a process flowchart of the PCBA which returns from the suspended mode.

FIG. 18 is a diagram showing a procedure example in the case where the computer printed circuit board 1001 that has been set in the suspended mode is returned to the original state. As in FIG. 14, the user starts the terminal device 1007, and requests the management computer 1008 to select the computer printed circuit board 1001 (Step 2101). The management computer 1008 selects the computer printed circuit board 1001, but the user selects the computer printed circuit board 1001 since the computer printed circuit board that is used has been already registered in the table 1301 (Step 2104). Then, the management computer 1008 notifies the terminal device 1007 of the information on the selected computer printed circuit board 1001. In this situation, the management computer 1008 changes the information on the running state of the table 1301 corresponding to the computer printed circuit board 1001 that instructs the return from the suspended mode to "running" (Step 2501).

Thereafter, the management computer 1008 instructs the computer printed circuit board 1001 which has been selected in the step 2104 and which has been in the suspended mode to execute the return process (Step 2502). The computer printed circuit board 1001 reads out the data necessary for returning from the main storage device 1202, and returns to a state which is before the computer printed circuit board 1001 has entered the suspended mode (Step 2503). Upon return of the computer printed circuit board 1001, the user instructs the terminal device 1007 to execute the business application (Step 2504), the terminal device 1007 gives a process instruction (Step 2505) to the computer printed circuit board 1001 that had been used before, and the computer printed circuit board 1001 resumes the business.

Figure 19:
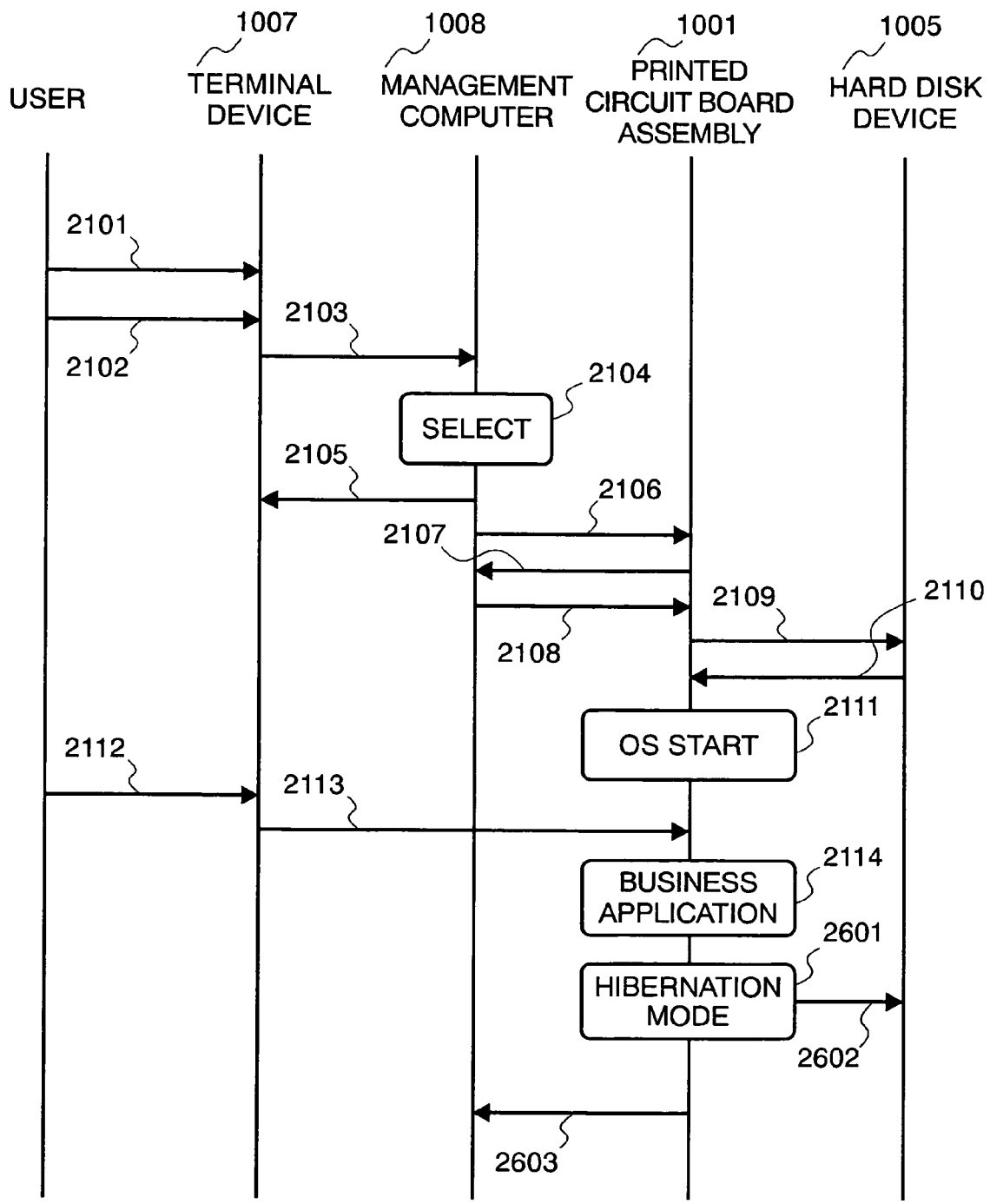
FIG. 19 exemplifies a process flowchart of the PCBA which enters a hibernation mode.

FIG. 19 is a diagram showing a procedure example in the case where the computer printed circuit board 1001 moves from the present mode to a hibernation mode while the computer printed circuit board 1001 is executing the business application (Step 2114). When the computer printed circuit board 1001 moves from the present mode to the hibernation mode, the computer printed circuit board 1001 writes all the information on the computer printed circuit board 1001 to the hard disk device 1005 (steps 2601 and 2602). Thereafter, the computer printed circuit board 1001 notifies the management computer 1008 of the entry of the hibernation mode. The notified management computer 1008 rewrites the information on the running state of the table 1301 corresponding to the notified computer printed circuit board 1001 to "in hibernation", and then registers the information on the user who had used the computer printed circuit board 1001 which has been shifted to the hibernation state in the inactive user list 1311 (Step 2603). Thereafter, the computer printed circuit board 1001 notifies the power control mechanism 1003 of the shut-off of the power. As a result, the power consumption can be minimized.

Figure 20:
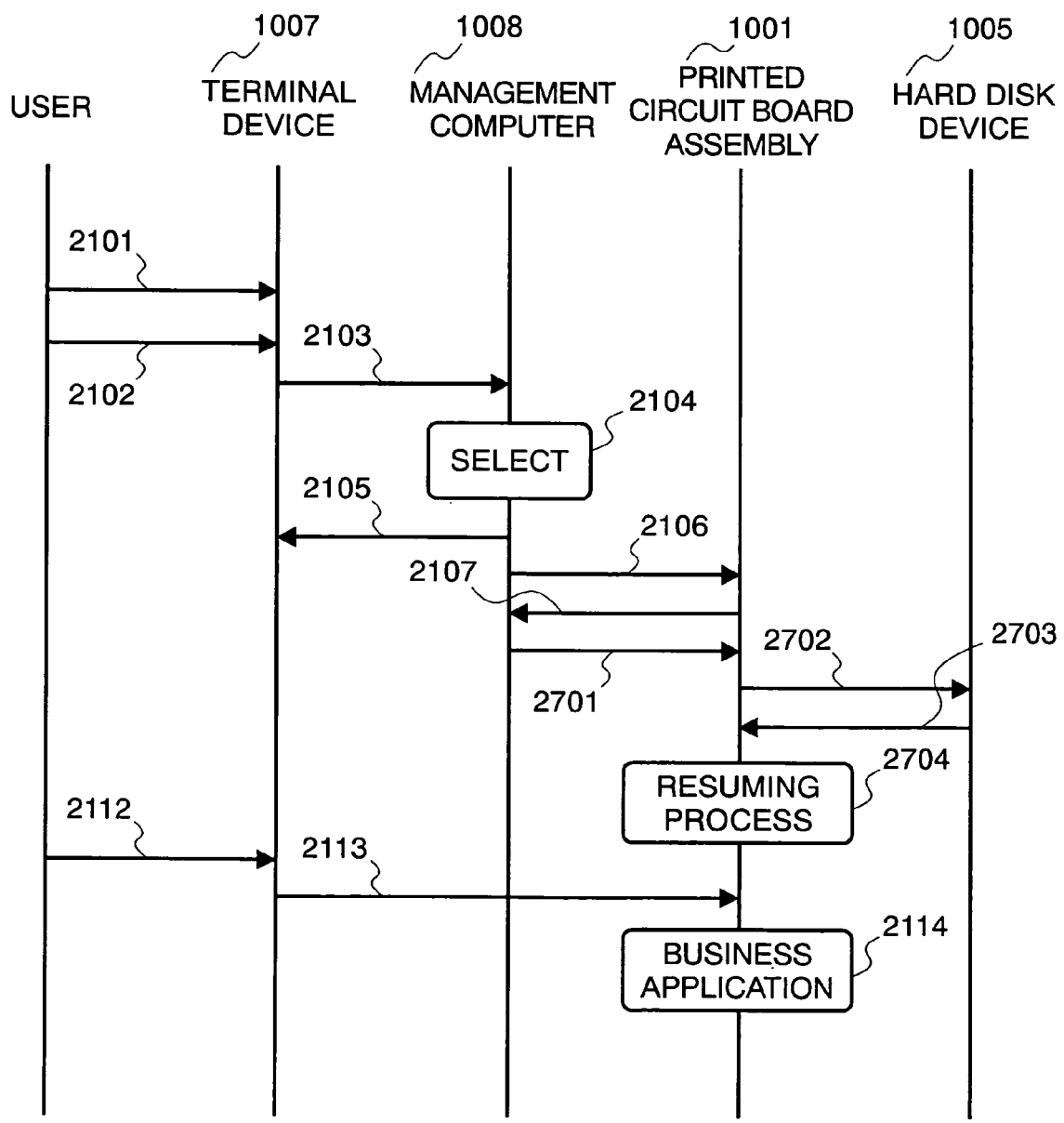
FIG. 20 exemplifies a process flowchart of the PCBA which returns from the hibernation mode.

FIG. 20 is a diagram showing a procedure example that resumes the process from the hibernation mode. As in FIG. 14, the user requests the management computer 1008 to send the information on the computer printed circuit board 1001 to be started through the terminal device 1007 (Step 2103). The requested management computer selects the computer printed circuit board 1001 to be started. In the selecting process, since the inactive user has been registered in the inactive user list 1311, the management computer compares the information on the requesting user with the inactive user list 1311, and selects the computer printed circuit board 1001 to be started. In this situation, the management computer 1008 rewrites the information on the running state of the table 1301 corresponding to the starting computer printed circuit board 1001 to "running", and then deletes the information on the user that has been registered in the inactive user list 1311 (Step 2104). Thereafter, the management computer 1008 notifies the terminal device 1007 of No. of the selected computer printed circuit board 1001 (Step 2105). In this situation, in the case where the hibernating computer-printed-circuit-board 1001 cannot be used for some reason, the management computer 1008 selects another computer printed circuit board 1001 as described above.

Also in this embodiment, as described above, in the case where the dynamic allocation is utilized as a method of allocating a network address (for example, IP address) to a computer printed circuit board 1001, the management computer 1008 executes the process of notifying the terminal device 1007 of the network address of the selected computer printed circuit board 1001 in the step 2105 after the network address of the computer printed circuit board 1001 is determined (after completion of the start process 2111 of the OS) because the network address is determined in the course of the start process 2111 of the OS. Even in the case where the fixed allocation is utilized as a method of allocating a network address (for example, IP address) to a computer printed circuit board 1001, the process of notifying the terminal device 1007 of the network address of the selected computer printed circuit board 1001 may be executed after the start process of the OS (step 2111).

In addition, the management computer 1008 instructs the power control mechanism 1003 to supply a power to the selected computer printed circuit board 1001, and to start the computer printed circuit board 1001 (Step 2106). The started computer printed circuit board 1001 transmits a BIOS sending request for reading out the OS over the network to the management computer 1008 (Step 2107).

The management computer 1008 that has received the BIOS sending request judges that the computer printed circuit board 1001 that has transmitted the BIOS sending request is a computer printed circuit board that is shifted from the hibernation state to the resume according to the computer printed circuit board No. included in the received request, and sends out the resume read BIOS to the computer printed circuit board 1001. The resume read BIOS does not read out a boot loader or OS from the storage area that has been allocated to the user, but allows the computer printed circuit board 1001 to execute the operation of reading out the operation information (memory image) of the computer printed circuit board 1001 which has been stored in the storage area in hibernation. It is possible that the normal operation and the process of resuming from the hibernation state are executed by one BIOS (Step 2701). The computer printed circuit board 1001 executes a read request of data at an address which is occupied by the user from the hard disk device 1005 by using the BIOS (Step 2702). The hard disk device 1005 sends the data that has been written by the computer printed circuit board 1001 at the time of shifting to the hibernation state to the computer printed circuit board 1001 according to the request (Step 2703). Thereafter, the computer printed circuit board 1001 executes the resuming process that returns all of data to the original (Step 2704). As a result, the computer printed circuit board 1001 becomes the same state as that at the time of shifting to the hibernation mode, and can continue the business application from this time (Step 2114).

In the above-described embodiment, the on/off operation of the power of the computer printed circuit board 1001 is controlled according to whether the power control mechanism 1003 is supplying a power to the power line 1009, or not. However, it is possible that the power is always supplied to the computer device 1002, and the on/off operation or reset operation of the power to the respective computer printed circuit boards 1001 is executed by using a power switch.

A backup server 1010 shown in FIG. 1 is a computer that backs up data that has been stored in the hard disk device 1005. The backup server 1010 has a storage medium such as an aggregative disk device like the hard disk device 1005, a tape changer, or an optical disk storage. The backup server 1010 is used to backup the data that has been stored in the hard disk device 1005 at appropriate time intervals by a manager. The provision of the backup server 1010 in the system makes it unnecessary that the users prepare the backup of the data that dispersedly exists on the computer printed circuit board 1001, individually. As a result, the manager can prepare the backup of the hard disk device 1005 in the backup server 1010 all at once. Consequently, it is possible that the operation (maintenance, etc.) to be executed by the user or the manager is reduced, the convenience is improved, and the management costs of the manager are reduced.

Second Embodiment

Figure 7:
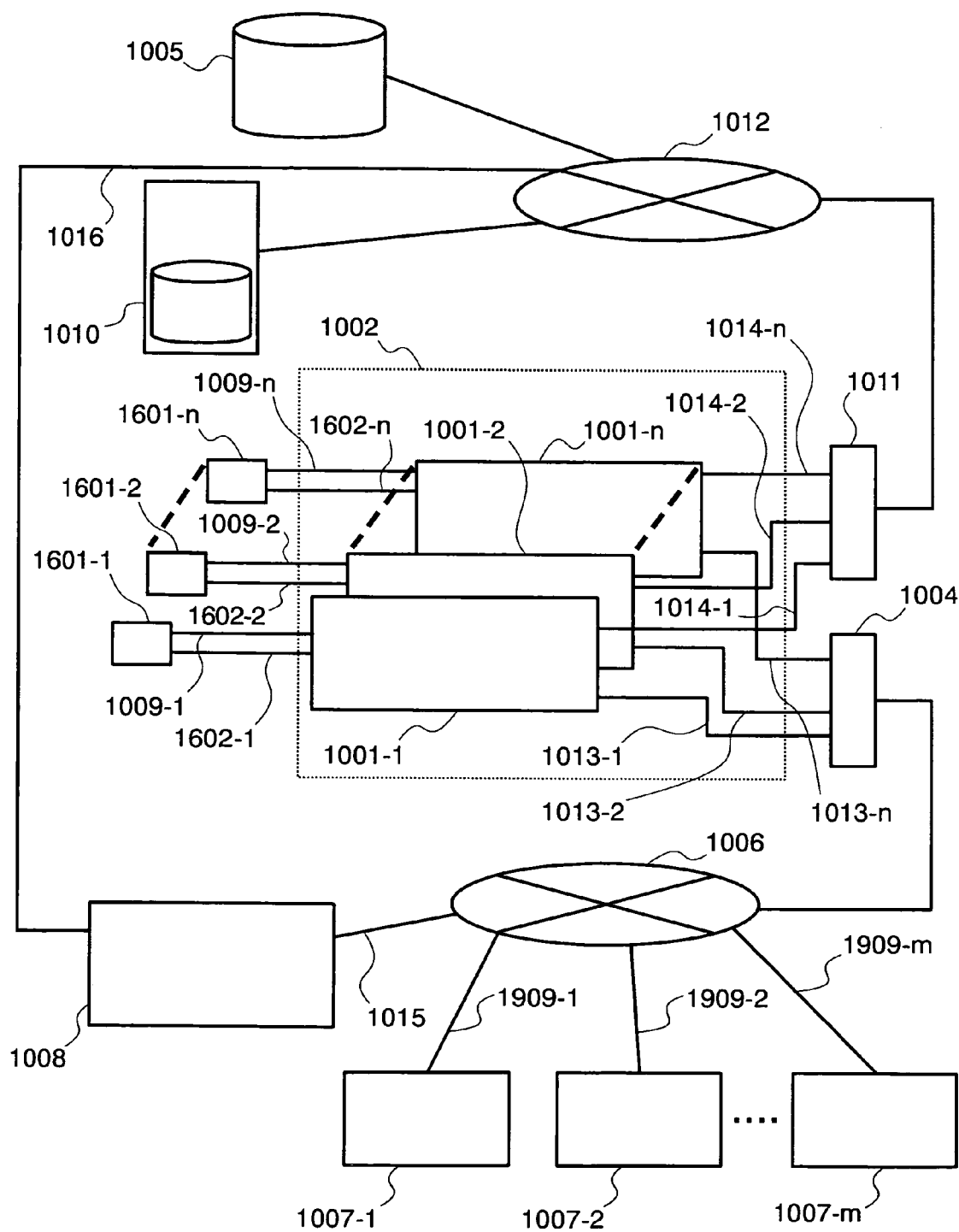
FIG. 7 exemplifies an entire structural block diagram of a second embodiment.

FIG. 7 is a diagram showing an example of a second embodiment. In this embodiment, the management computer 1008 directly instructs the computer printed circuit board 1001 to turn on the power supply whereas the power control mechanism 1003 and the management computer 1008 control power-on to the computer printed circuit board 1001 in the first embodiment (FIG. 1). For that reason, the respective computer printed circuit boards 1001-1 to 1001-*n* are coupled with individual power supplies (1601-1 to 1601-*n*), respectively.

The management computer 1008 instructs the computer printed circuit board 1001 to execute power-on by using a specific packet over the first network 1006.

Figure 8:
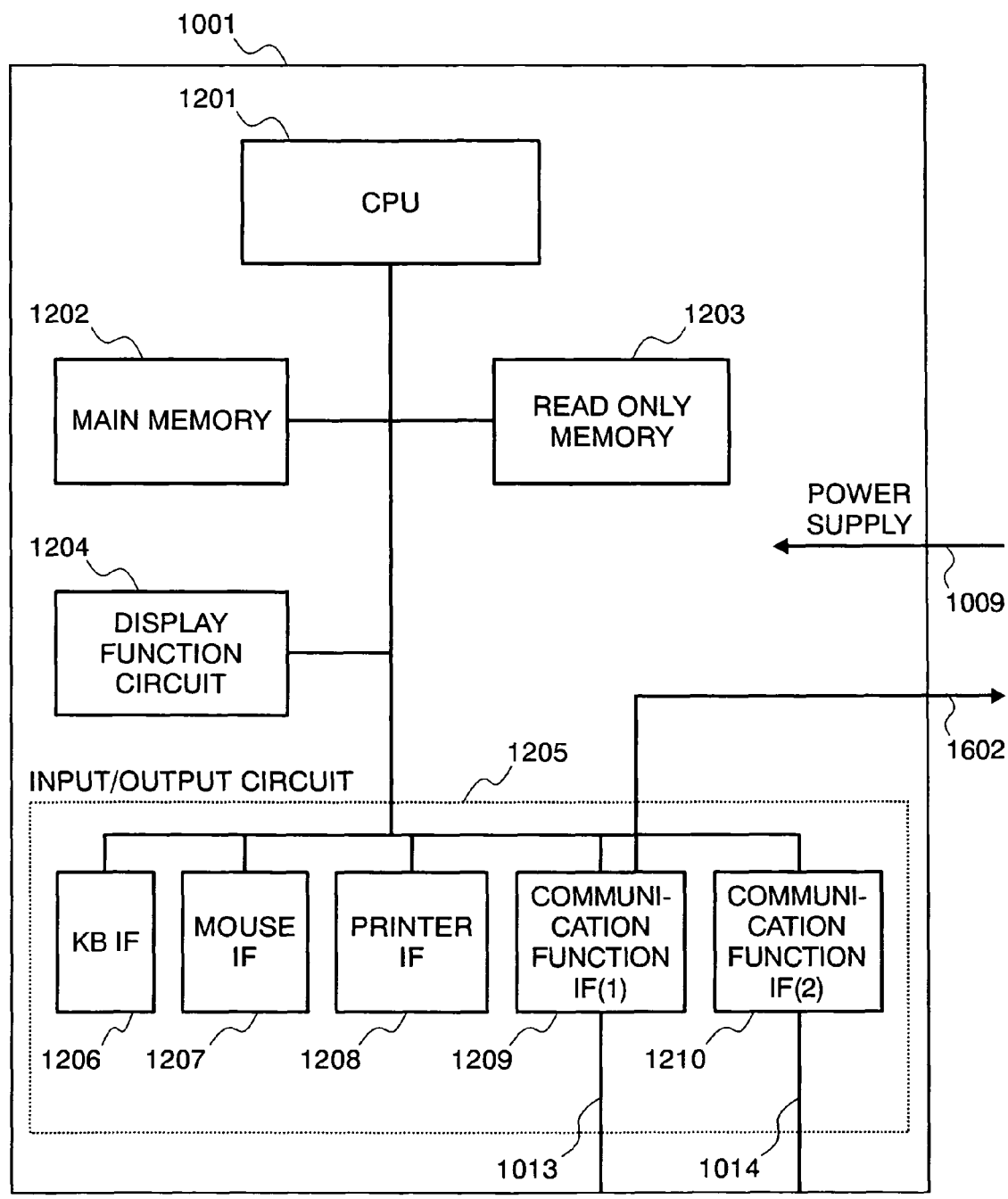
FIG. 8 exemplifies a structural block diagram of a PCBA according to the second embodiment.

FIG. 8 is a diagram showing a structural example of the computer printed circuit board 1001 that receives an instruction of power-on from the management computer 1008 in this embodiment. As compared with FIG. 2, this embodiment is different therefrom in that the first communication function interface 1209 is coupled to a power control line 1602, and the power control line 1602 is coupled to the individual power supply 1601. Upon receiving a specific packet from the management computer 1008 over the first network 1006, the first communication function interface 1209 in this embodiment controls the power control line 1602, and instructs the individual power supply 1601 to execute power-on. The individual power supply 1601 that receives the instruction supplies a power to the corresponding computer printed circuit board 1001. As a result, the computer printed circuit board 1001 that has received the specific packet from the management computer 1008 starts.

The example of providing the power control line 1602 on the side of the first communication function IF 1209 is given in FIG. 8. However, the configuration is not limited to this, but the second communication function IF 1210 may be provided with the power control line 1602. In this case, the specific packet from the management computer 1008 is received through the second network 1012.

In this example, although the power supplies are separated, individually, in the above description, an integral power supply may be provided and supply a power to the respective computer printed circuit boards 1001-1 to 1001-*n*, individually. Also, the power supply may be doubled.

Third Embodiment

Figure 9:
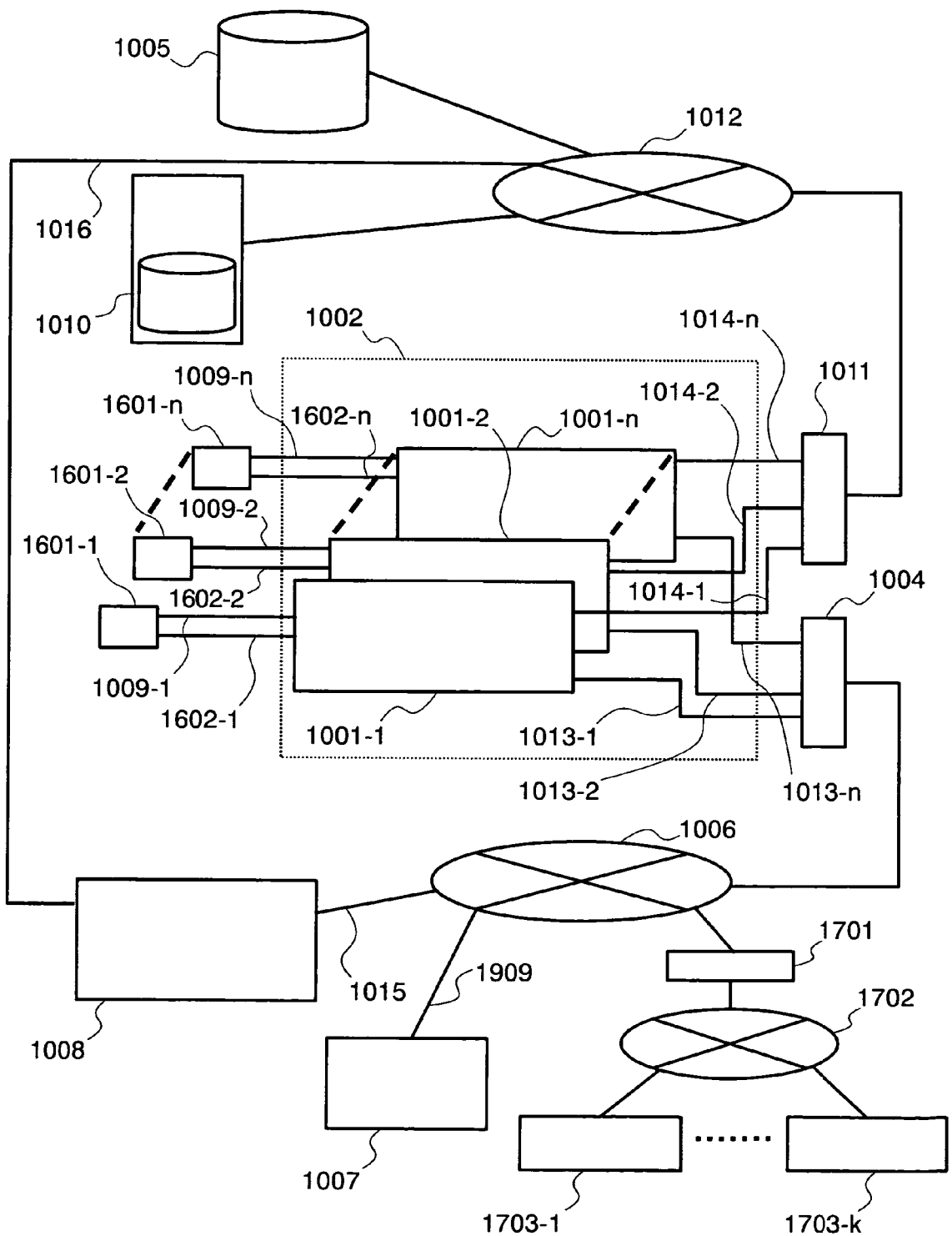
FIG. 9 exemplifies an entire structural block diagram of a third embodiment.

FIG. 9 is a diagram showing an example of a third embodiment.

In this embodiment, the computer printed circuit board 1001 is controlled from not only the terminal device 1007 but also remote terminal devices (1703-1 to 1703-*k*) over an internet 1702. In this embodiment, a firewall gateway 1701 is located at a node at which the internet 1702 is coupled to the first network 1006. The first network 1006 is a dedicated network for an enterprise which is generally called "intranet". In the case of connection from the internet 1702 outside of the enterprise, it is necessary to discriminate whether the user is legitimate, or not, at a gate, and the firewall gateway 1701 serves to execute the above operation. In this embodiment, the firewall gateway 1701 determines whether the user who uses the remote terminal device 1703 is right, or not, by means of certification information, and allows the internal first network 1006 to be used by the remote terminal device 1703 when the user is right (certification is successful).

Fourth Embodiment

In this embodiment, a remote terminal device 1801 executes a communication through a radio interface 1802. The radio interface 1802 is coupled to the internet 1702 through a base station 1803. According to this embodiment, the user can use the computer printed circuit board 1001 even during traveling. In this embodiment, the connection configuration used by the radio interface 1802 may be a radio connection using a cellular phone, or may be a connection configuration using a radio LAN.

The structure of the remote terminal devices 1703 and 1801 may be identical with the structure of the terminal device 1007. In that case, the communication function IF 1909 of the remote terminal device 1801 is an interface that is coupled with the radio interface 1802.

Fifth Embodiment

Figure 12:
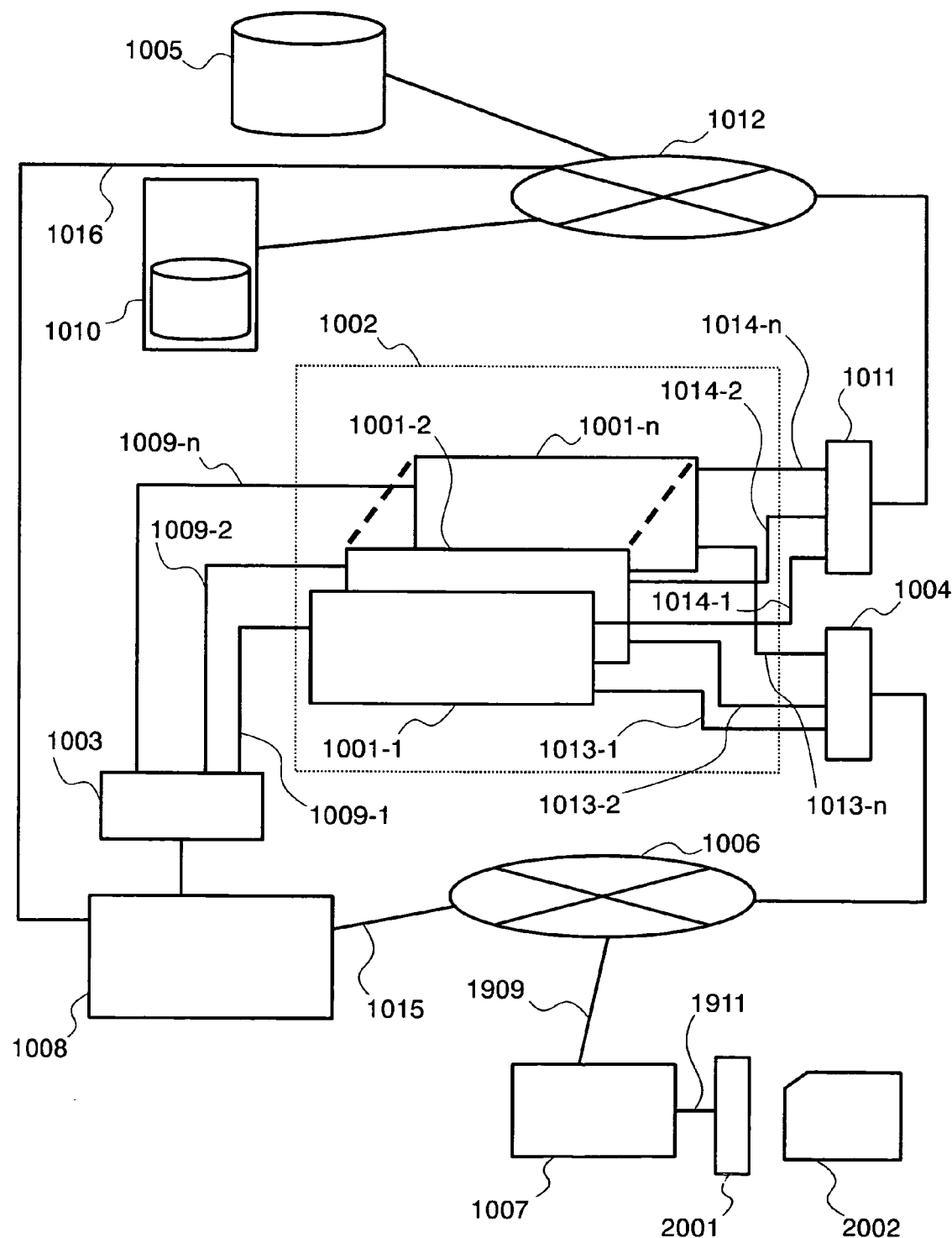
FIG. 12 exemplifies an entire structural block diagram of a fifth embodiment.

FIG. 12 is a diagram showing an example of a fifth embodiment.

In this embodiment, in the case where the terminal device 1007 shown in FIG. 1 is used by the user, an certification device 2002 is used for determining whether the user is a right user (in the present specification, "right" or "legitimate" means that the use of the system is allowed by the manager in the system), or not. The terminal device 1007 uses a reader/writer 2001 in order to access the certification device 2002. The reader/writer 2001 is coupled to the terminal device 1007 through the general purpose I/O interface 1911. In this embodiment, the management computer 1008 executes the user certification using the certification device 2002, and allows the legitimate user to use the computer printed circuit board 1001. The reader/writer 2001 may be integrated with the terminal device 1007.

Figure 21:
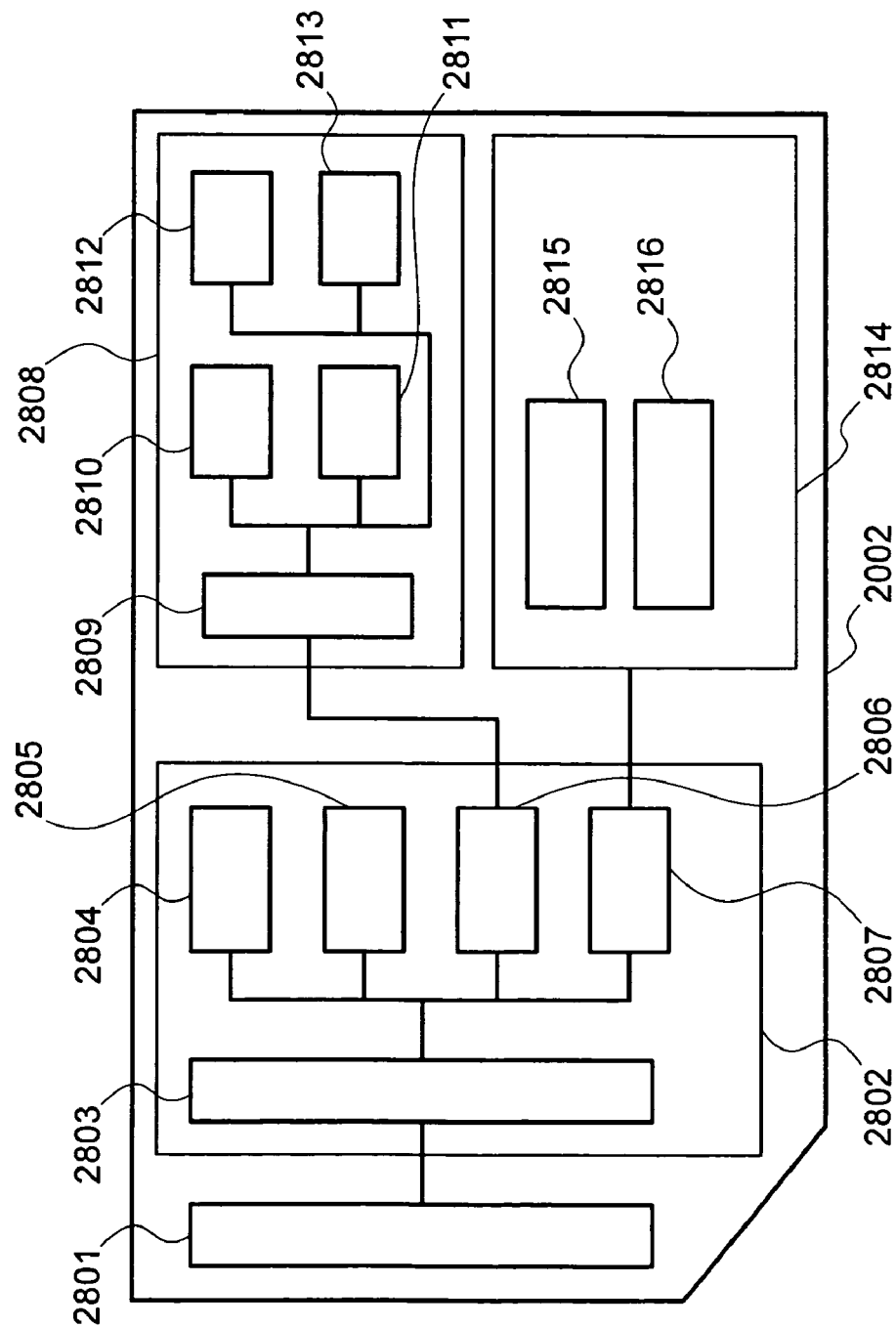
FIG. 21 exemplifies a structure of a certification device.

FIG. 21 is a diagram showing a structural example of the certification device 2002. A controller 2802, an IC card unit 2808 having a tamper resistant area, and a large capacity nonvolatile memory 2814 are installed in the certification device 2002. A process that requires security such as certification is executed by the IC card unit 2808. When a large capacity of data such as file data is going to be stored, the nonvolatile memory 2814 is used. The controller 2802 controls the use (particularly, choice) of the IC card unit 2802 and the nonvolatile memory 2814.

The certification device 2002 is coupled to the reader/writer 2001 through a terminal 2801, and a signal is delivered to the controller 2802 from the terminal 2801. The controller 2802 has a CPU 2804, a memory 2805, an IC card IF 2806, a nonvolatile memory IF 2807, and a card IF 2803. Those elements are mutually coupled to each other through an internal bus. The CPU 2804 determines whether the received command uses the nonvolatile memory, or uses the IC card unit, and then requests the IC card unit 2808 or the nonvolatile memory 2814 to execute a command process through an appropriate interface.

The IC card unit 2808 has an interface 2809, a CPU 2810, a memory 2811, a cryptography processor 2812, and a nonvolatile memory 2813. Those elements are mutually coupled to each other via an internal communication line such as a bus (hereinafter, referred to as a bus). In the case of processing by the IC card unit 2808, for example, in the process of preparing sign, the cryptography processor 2812 prepares sign data by using a private key that is stored in the nonvolatile memory 2813, and the CPU 2810 sends the sign data to the controller 2802 through the interface 2809.

In the case of using the nonvolatile memory 2814, the controller 2802 accesses the nonvolatile memory as with the general file. For example, the controller 2802 accesses communication software 2815 or library software 2816 that is stored as a data file in the nonvolatile memory 2814 as a file.

Figure 22:
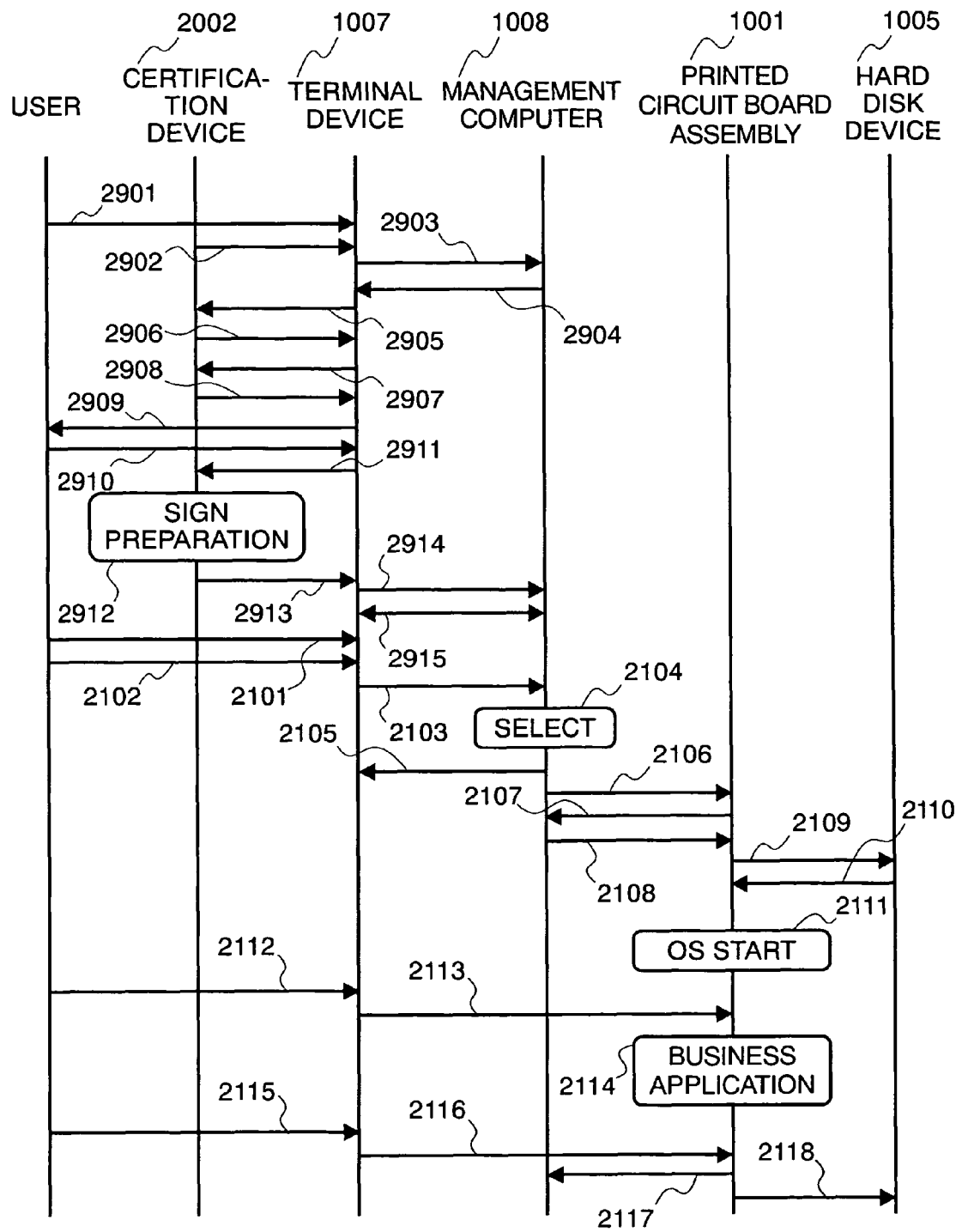
FIG. 22 exemplifies a user certification process flowchart by using the certification device.

FIG. 22 is a diagram showing one example of a user certification procedure using the certification device 2002 in this embodiment. After the user has loaded the certification device 2002 into the reader/writer 2001, the user inputs a login request 2901 to the terminal device 1007 (Step 2901). In this situation, the terminal device 1007 reads the library software 2816 necessary for certification from the nonvolatile memory 2814 of the certification device 2002 (Step 2902). The terminal device 1007 gives a login request to the management computer 1008 (Step 2903). The management computer 1008 that has received the login request returns an certification information request to the terminal device 1007 (Step 2904). The terminal device 1007 that has received the certification information request sends a certificate request to the certification device 2002 (Step 2905). The certification device 2002 that has received the certificate request reads the certificate that is stored in the nonvolatile memory 2813 of the IC card unit 2808 within the card, and then sends the certificate to the terminal device 1007 (Step 2906).

In addition, the terminal device 1007 issues a sign request to the certification device 2002 (Step 2907). Because the secret key that is stored in the IC card unit 2808 is used in the preparation of the sign, the certification device 2002 returns a personal identification number request for inquiring the licensing of the secret key to the terminal device 1007 (Step 2908). In order to permit the user to input the personal identification number for using the secret key, the terminal device 1007 displays the personal identification number request (Step 2909). The user inputs the personal identification number (Step 2910). The terminal device 1007 transmits the inputted personal identification number to the certification device 2002 (Step 2911). The certification device 2002 confirms the contents of the received personal identification number and recognizes that the personal identification number is right. Thereafter, the certification device 2002 prepares sign by means of the cryptography processor 2813 within the IC card unit 2809 (Step 2912), and transmits the prepared sign data to the terminal device 1007 (Step 2913). Thereafter, the terminal device 1007 implements a common key exchange 2915 with respect to the management computer 1008 by using the received sign data (Steps 2914 and 2915). As a result, the management computer 1008 certifies that the user who uses the terminal device 1007 is right.

After completion of the common key exchange, the processes 2101 to 2118 are executed by the user, the terminal device 1007, the management computer 1008, the computer printed circuit board 1001, and the hard disk device 1005, and the user executes the business application on the computer printed circuit board 1001 and executes the completion process, as shown in FIG. 14 in the first embodiment.

In addition, while the business start process is executed after the start process 2111 of the OS, the confirmation operation may be executed by using information such as the secret key inherent to the user and the user identifier which are stored in the IC card unit 2808 within the certification device 2002 in order to certify whether the user who uses the computer printed circuit board 1001 is right, or not.

That is, for example, the management computer 1008 compares the user identifier that is stored in the IC card unit 2808 within the certification device 2002 with the user identifier that has been registered in the user used region list shown in FIG. 5. If they are identical with each other, the management computer 1008 allocates the storage area of the storage device corresponding to the user identifier. Also, in the case where the computer printed circuit board 1001 that is used by the user is predetermined in correspondence with the user identifier, the management computer 1008 allocates the computer printed circuit board 1001 corresponding to the user identifier.

That is, after the common key exchange has been completed, the personal identification number that has been transmitted by the step 2910 or the user identifier which is transmitted from the certification device 2002 together with the sign data in the step 2913 is transmitted to the management computer 1008 from the terminal device 1007 (Step 2103).

The management computer 1008 specifies the computer printed circuit board 1001 with reference to the table (FIG. 3), in which the predetermined user identifier and the computer printed circuit board 1001 are associated with each other, on the basis of the received user identifier (Step 2106). Then, the management computer 1008 transmits an address that specifies an area used by the user which is obtained with reference to the table (FIG. 5), in which the user identifier and the storage device are associated with each other, to the specified computer printed circuit board 1001 (Step 2106).

The computer printed circuit board 1001 starts the OS stored at the address on the basis of the transmitted address (Steps 2109 and 2110). When the OS starts, the user can execute the business.

According to this embodiment, the start of the OS by using the certification device 2002 and the confirmation operation using information such as the certificate or secret key inherent to the user which has been stored within the IC card unit 2808 are executed, thereby making it possible to provide a computer system that is higher in the security than that in the first embodiment. The terminal device 1007 may be integrated with the reader/writer.

Sixth Embodiment

Figure 13:
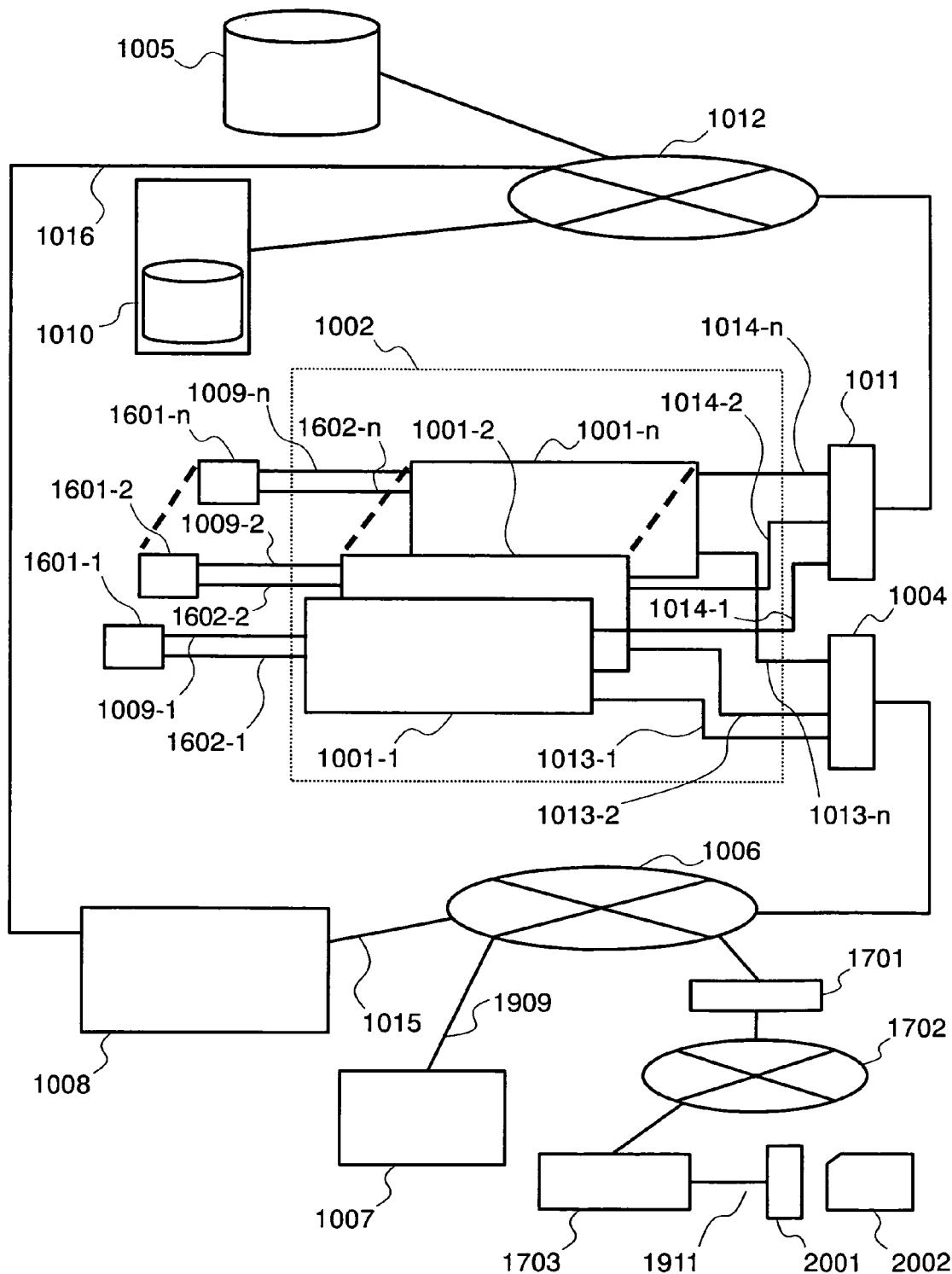
FIG. 13 exemplifies an entire structural block diagram of a sixth embodiment.

FIG. 13 is a diagram showing an example of a sixth embodiment.

In this embodiment, the certification device 2002 is used in order to judge whether the user is right, or not, when the user uses the remote terminal device 1703 shown in FIG. 9. The remote terminal device 1703 is coupled to the reader/writer 2001 for accessing the certification device 2002 through the general purpose I/O interface 1911. Different from the fifth embodiment, the user certification using the certification device 2002 is executed by not the management computer 1008 but the firewall gateway 1701. The procedure of the user certification is identical with that described with reference to FIG. 22.

However, the process that is executed by the management computer 1008 in FIG. 22 is executed by the firewall gateway 1701. Since the user is certified by the firewall gateway 1701, the right user can be connected to the first network 1006. The user certification using the certification device 2002 may be further executed in the management computer 1008 in addition to the user certification in the firewall gateway 1701. As a result, not only the licensing of the first network 1006 is certified, but also it can be certified whether the user is a right user who uses the computer printed circuit board 1001 that is managed by the management computer 1008, or not. The procedure of executing the user certification by using the certification device 2002 in both of the firewall gateway 1701 and the management computer 1008 is a procedure in which after the steps 2901 to 2915 shown in FIG. 22 have been executed by the user, the certification device 2002, the terminal device 1007, and the firewall gateway 1701, the steps 2901 to 2915 are further executed by the user, the certification device 2002, the terminal device, and the management computer 1008.

Seventh Embodiment

Figure 23:
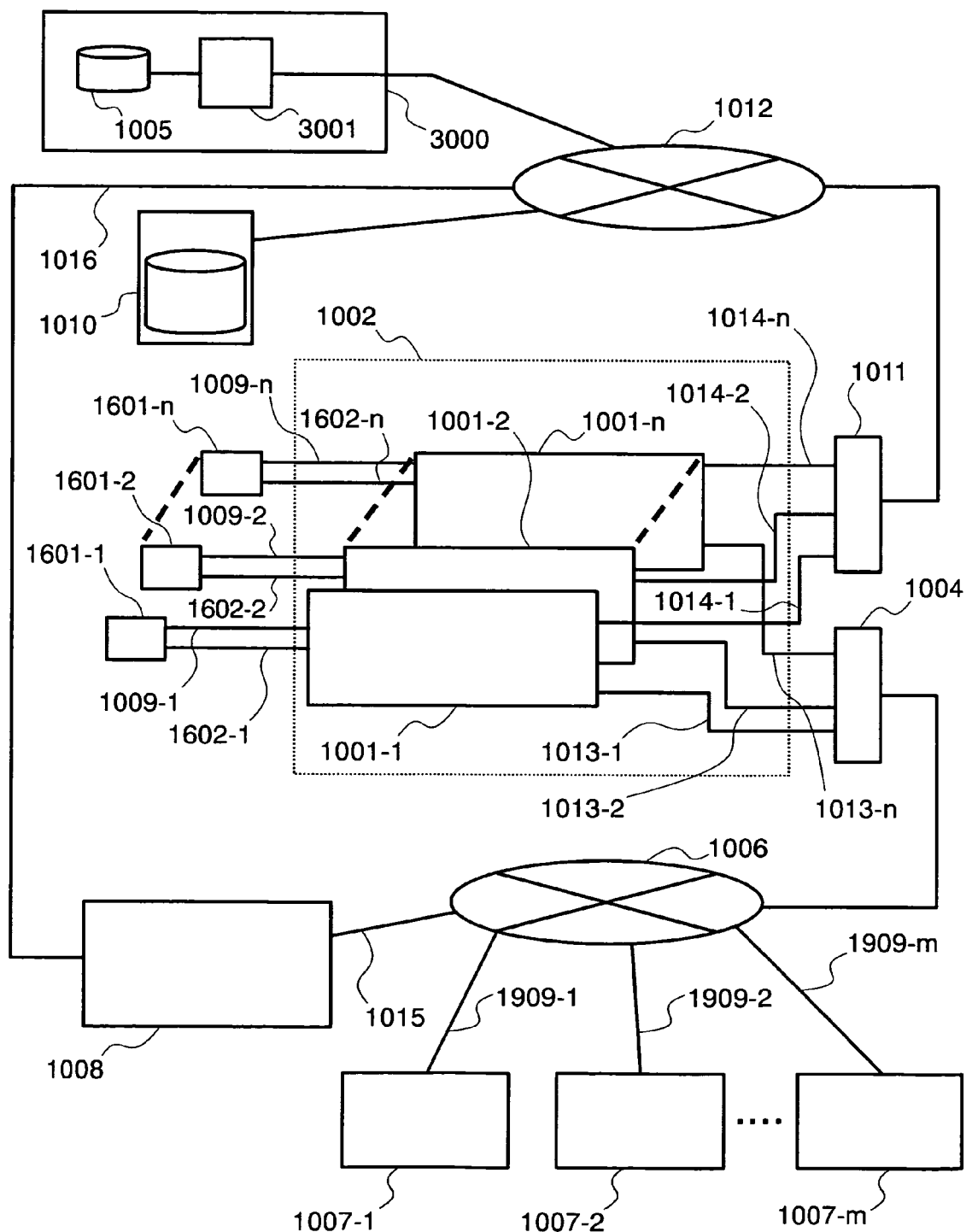
FIG. 23 exemplifies an entire structural block diagram of a seventh embodiment.

FIG. 23 is a diagram showing an example of a seventh embodiment.

In this embodiment, a storage device 3000 is equipped with the hard disk device 1005 built therein, and the storage device 3000 is applied to the system structure described with reference to FIG. 7. The storage device 3000 is equipped with an access right determination unit 3001 built therein that determines the right of an access to the hard disk device 1005 from the computer that is coupled to the second network 1012. A control unit disposed in the hard disk device 1005 may determine the access right. In this case, the hard disk device 1005 is used as it is.

In this embodiment, the access right determination unit 3001 determines whether the computer printed circuit board 1001 (in fact, the user who uses the computer printed circuit board 1001) has been registered as a computer printed circuit board 1001 that is permitted to use the hard disk device 1005, or not, at a stage where the computer printed circuit board 1001 starts to access the hard disk device 1005. Then, when the computer printed circuit board 1001 has been registered, the computer printed circuit board 1001 can access the hard disk device 1005.

FIG. 24 is a diagram showing an example of an access management list 3002 which is stored in the access right determination unit 3001. The access right determination unit 3001 determines the computer printed circuit board 1001 that can access the hard disk device 1005 on the basis of the information that has been registered in the access management list 3002. In the access management list 3002 is stored information on a correspondence between a client identifier 3003 that is given to the computer printed circuit board 1001 and storage identifiers (3004, 3005) that are given to the hard disk device 1005. Only the computer printed circuit board 1001 corresponding to the client identifier 3003 which has been registered in the access management list 3002 can access the storage area within the hard disk device 1005 which is indicated by the storage identifier corresponding to the client identifier. The information that is registered in the access management list 3002 is inputted to the access right determination unit 3001 through the management computer 1008.

More specifically, the client identifier stores the information corresponding to the user name 1402 shown in FIG. 5 therein. The storage identifier is made up of the hard disk designation and the logical unit No., and stores the information corresponding to the hard disk designation 1403 and the logical unit No. 1404 shown in FIG. 5, respectively.

Figure 25:
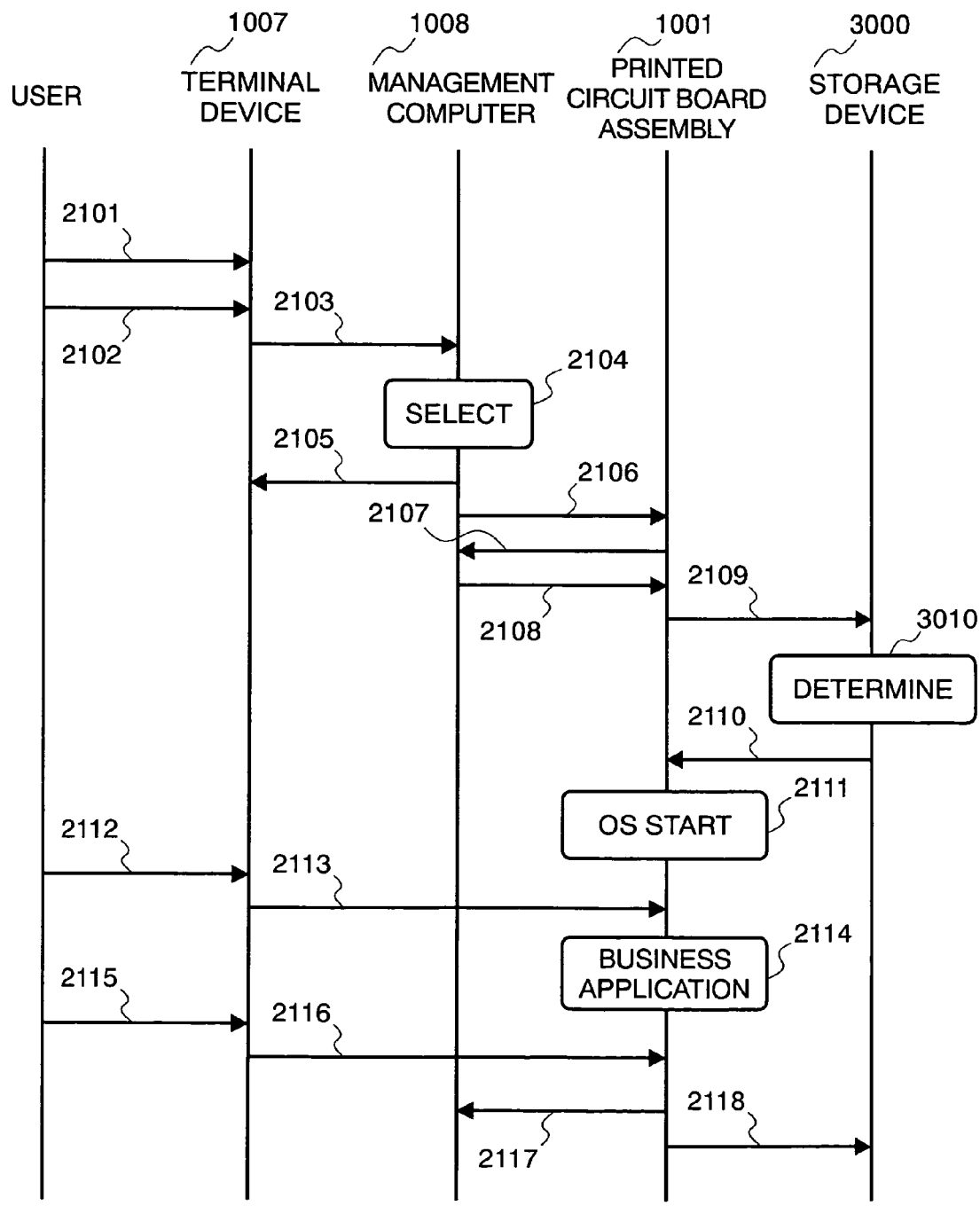
FIG. 25 exemplifies a process flowchart in the case of using a storage device including an access right determination unit therein.

FIG. 25 is a diagram showing an example of a starting procedure in the case of using the storage device 3000. In this embodiment, a step 3010 executed in the storage device 3000 is added to the procedure shown in FIG. 14. Through a sequential procedure (step 2101 to step 2105) according to a start request from the user, the management computer 1008 executes the power-on process 2106 with respect to the selected computer printed circuit board 1001. The computer printed circuit board 1001 to which the power is supplied makes the BIOS sending request to the management computer 1008 (step 2106), and the management computer 1008 sends the BIOS together with the user name 1402 corresponding to the restarting user, the hard disk designation 1403 and the logical unit No. 1404 from the information stored in the user used region list 1401 (step 2108). The computer printed circuit board 1001 makes a request of reading the hard disk occupied by the computer printed circuit board 1001 from the storage device 3000 by using the BIOS (step 2109). In this situation, the computer printed circuit board 1001 transmits the information on the user name 1402 which has been transmitted together with the BIOS from the management computer 1008 to the storage device 3000 as the client identifier. In the storage device 3000, the access right determination unit 3001 determines whether the client identifier corresponding to the storage identifier of the accessed hard disk device 1005 coincides with the client identifier that has been transmitted from the computer printed circuit board 1001, or not, with reference to the access management list 3002 (Step 3010). In the case where information coincides with each other, the access right determination unit 3001 permits the computer printed circuit board 1001, which requested the access, to access the hard disk device 1005 as a permitted computer. In the subsequent operation, the user can execute business on the computer printed circuit board 1001 through a continuous sequential process.

According to this embodiment, in the system configuration in which the plural computers access the storage device through the network, because the storage device can check the right of the accessing computers in advance, an access from a false user can be eliminated, thereby being capable of providing a secure system.

Eighth Embodiment

Figure 26:
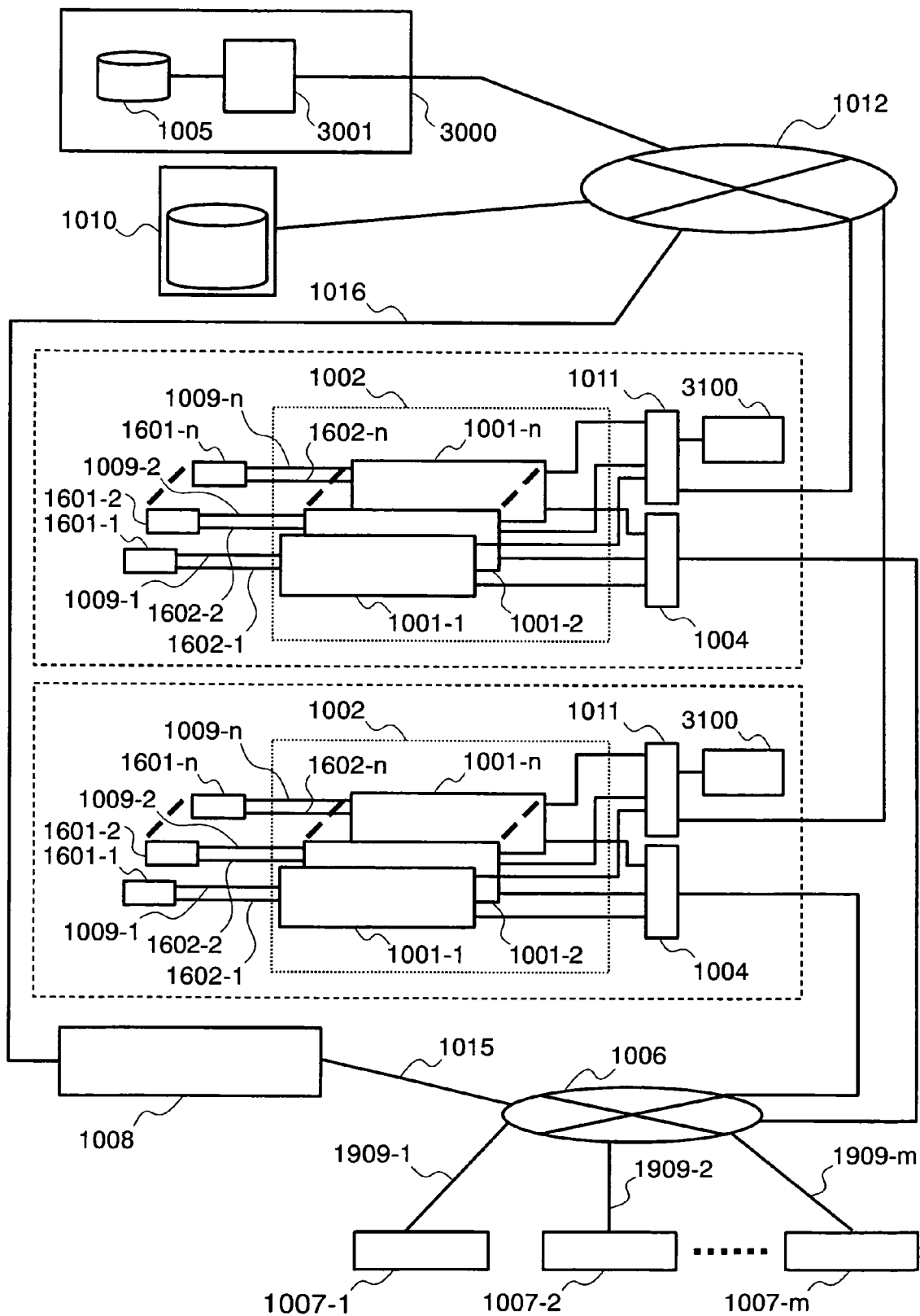
FIG. 26 exemplifies an entire structural block diagram of an eighth embodiment.

FIG. 26 shows an example of an eighth embodiment.

In the above-mentioned embodiment, in order to start the computer printed circuit board 1001, it is necessary that the computer printed circuit board 1001 per se acquires the BIOS for reading the OS through the network from the management computer 1008. However, as the number of computer printed circuit boards 1001 is more increased, a load on the network between the management computer 1008 and the computer printed circuit boards 1001 is more increased. Under the circumstances, in this embodiment, in order to disperse the load on the network, the computer printed circuit boards 1001 that are coupled to the second hub device 1011 are classified into plural groups, and a printed-circuit-board management computer 3100 that transmits the BIOS to each of the groups is installed. As a grouping method, there are a case in which plural second hub devices 1011 are provided in each of the groups, and a case in which one second hub device 1011 is theoretically divided into plural pieces through a VLAN to constitute the group. The computer printed circuit board 1001 acquires the BIOS from the printed-circuit-board management computer 3100 that is coupled to the second hub device 1011 (or VLAN) in the group to which the computer printed circuit board 1001 belongs.

FIG. 27 is a diagram showing an example of the table 1301 which is stored in the management computer 1008 in order to implement this embodiment. As with the table 1301 shown in FIG. 3, the computer printed circuit board No. 1302, the power state 1303, the user name 1304, the attribute information 1305, and the running state 1307 are stored in the table 1301. In addition, a group No. 1307 to which the computer printed circuit board 1001 belongs is stored as information representative of a group to which the computer printed circuit board 1001 belongs. The computer printed circuit board 1001 is managed so as to determine a unique computer printed circuit board 1001 according to the combination of the group No. 1307 with the computer printed circuit board No. 1302 (that is, the computer printed circuit boards having the same No. may exist in the different groups). Accordingly, even in other information (inactive user list 1311) which is managed by the management computer 1008, the computer printed circuit board is managed by the combination of the computer printed circuit board No. with the group No. instead of the computer printed circuit board No.

FIG. 28 is a diagram showing an example of a printed-circuit-board network table 3110 that stores the network information of the computer printed circuit board 1001 which is stored in the printed-circuit-board management computer 3100. In the printed-circuit-board network table 3110, there are stored a MAC address 3112 as the network information of the computer printed circuit board 1001, which corresponds to No. 3114 which is information representative of the group and No. 3111 representative of the computer printed circuit board 1001. Also, an IP address 3113 that is intended to be allocated to the computer printed circuit board 1001 is stored in the printed-circuit-board network table 3110.

Figure 29:
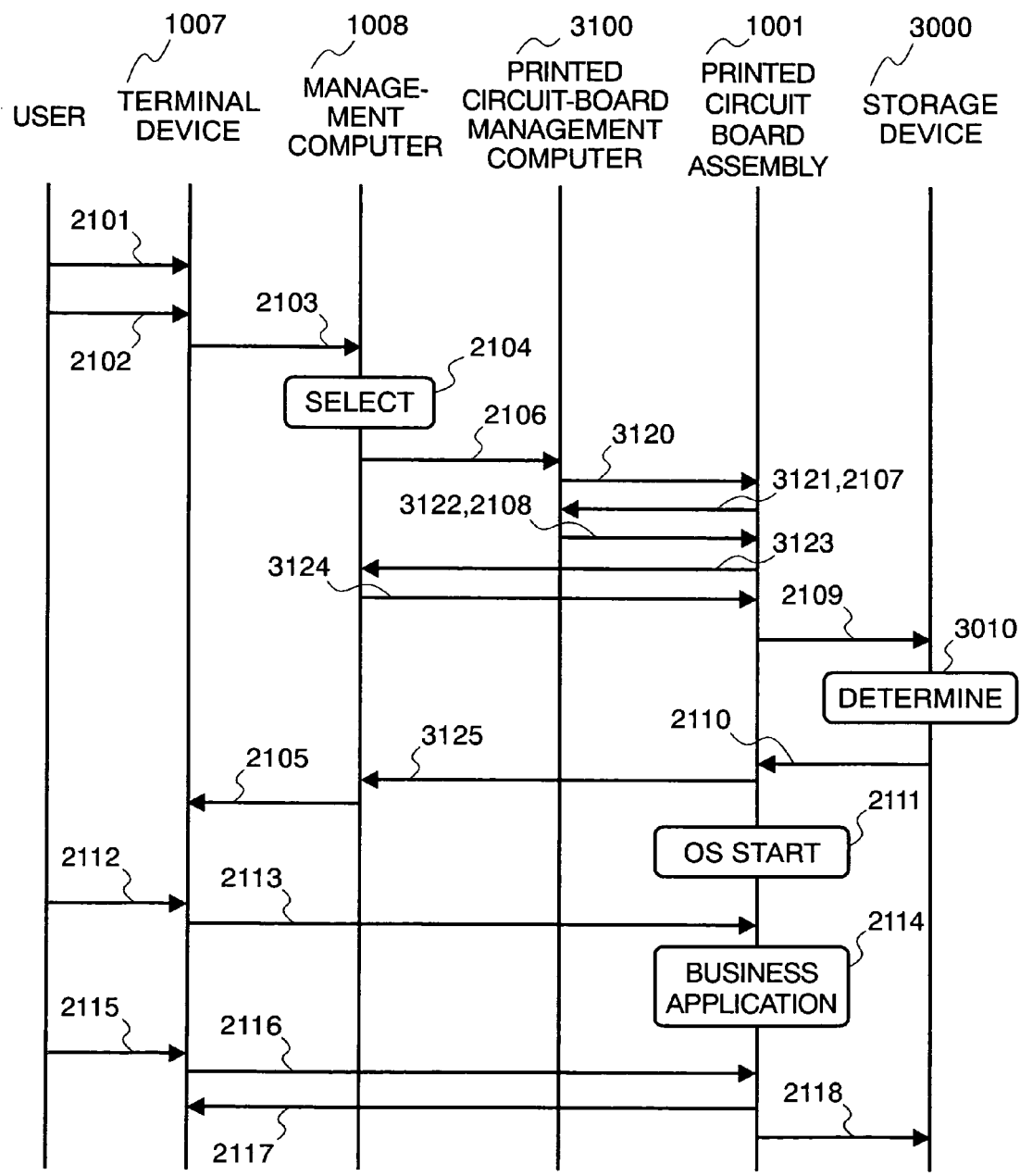
FIG. 29 exemplifies a process flowchart in the case of using a printed-circuit-board management computer.

FIG. 29 is a diagram showing a procedure example of the starting process of the computer printed circuit board 1001 in the case of using the printed-circuit-board management computer 3100 in this embodiment. In the process shown in FIG. 29, steps 3120 to 3125 are added to the procedure described with reference to FIG. 25 as a new procedure. Through a sequential procedure (Steps 2101 to 2104) according to a start request from the user, the management computer 1008 transmits the group No. 1307 and the printed circuit board No. 1302 of the selected computer printed circuit board 1001 to the printed-circuit-board management computer 3100 of the group to which the computer printed circuit board 1001 belongs in order to execute power-on of the selected computer printed circuit board 1001 (Step 2106).

The printed-circuit-board management computer 3100 that has received the transmitted Nos. instructs the power-on of the computer printed circuit board 1001 corresponding to the printed circuit board No. 1302. As a specific method of power on, the method that is executed by the management computer 1008 and the power control mechanism 1003 in the above-mentioned embodiment may be executed by the printed-circuit-board management computer 3100 (Step 3120). The computer printed circuit board 1001 whose power is on transmits the MAC address of the second communication function interface 1210 provided in the computer printed circuit board 1001 to the printed-circuit-board management computer 3100 in order to establish the network connection (Step 3121). The printed-circuit-board management computer 3100 that has received the MAC address of the computer printed circuit board 1001 returns the IP address 3113 corresponding to the transmitted MAC address with reference to the printed-circuit-board network table 3110. Subsequently, the computer printed circuit board 1001 transmits the BIOS sending request for reading the OS over the network to the printed-circuit-board management computer 3100 by using the received IP address 3113 (Step 2107). The printed-circuit-board management computer 3100 transmits the group No. 1307 and the printed circuit board No. 1302 of the computer printed circuit board 1001 corresponding to the IP address 3113 to the computer printed circuit board 1001 together with the read BIOS (Step 2108).

The computer printed circuit board 1001 that has received the BIOS executes the BIOS. In order to obtain the information on the storage device, the computer printed circuit board 1001 then transmits the group No. 1307 and the printed circuit board No. 1302 of the computer printed circuit board 1001 to the management computer 1008 (Step 3123). The management computer 1008 reads the user name 1304 corresponding to the computer printed circuit board 1001 from the group No. 1307 and the printed circuit board No. 1302. Then, the management computer 1008 returns the information on the user name 1304, and the hard disk designation 1403 and the logical unit No. 1404 corresponding to the user name 1402 which coincides with the user name 1304 to the computer printed circuit board 1001 (Step 3124).

The computer printed circuit board 1001 uses the transmitted information as the client identifier 3004 and the storage identifiers (3004, 3005), and requests the storage device 3000 to read the data that has been stored in the storage area which is occupied by the computer printed circuit board 1001 (Step 2109). The storage device 3000 determines the access right (Step 3010). The computer printed circuit board 1001 notifies the management computer 1008 of the IP address of the first communication function IF 1209 provided in the computer printed circuit board 1001 at the stage of starting an access to the storage device 3000 (Step 3125). Then, the management computer 1008 notifies the terminal device 1007 of the IP address (Step 2105).

Also in this situation, as described in the first embodiment, in the case where the dynamic allocation is utilized as a method of allocating a network address (for example, IP address) to a computer printed circuit board 1001, the management computer 1008 executes the process of notifying the terminal device 1007 of the network address of the selected computer printed circuit board 1001 in the step 2105 after the network address of the computer printed circuit board 1001 is determined (after completion of the start process 2111 of the OS) because the network address is determined in the course of the start process 2111 of the OS. Even in the case where the fixed allocation is utilized as a method of allocating a network address (for example, IP address) to a computer printed circuit board 1001, the process of notifying the terminal device 1007 of the network address of the selected computer printed circuit board 1001 may be executed after the start process of the OS (step 2111).

The subsequent procedure is identical with that in FIG. 23, and the user can execute the business on the computer printed circuit board 1001 through a continuous sequential process.

According to this embodiment, even if the number of computer printed circuit boards 1001 is increased, an increase in the network load due to the transmission of the read BIOS can be suppressed to a given amount, thereby being capable of providing a stably running system.

Ninth Embodiment

Figure 30:
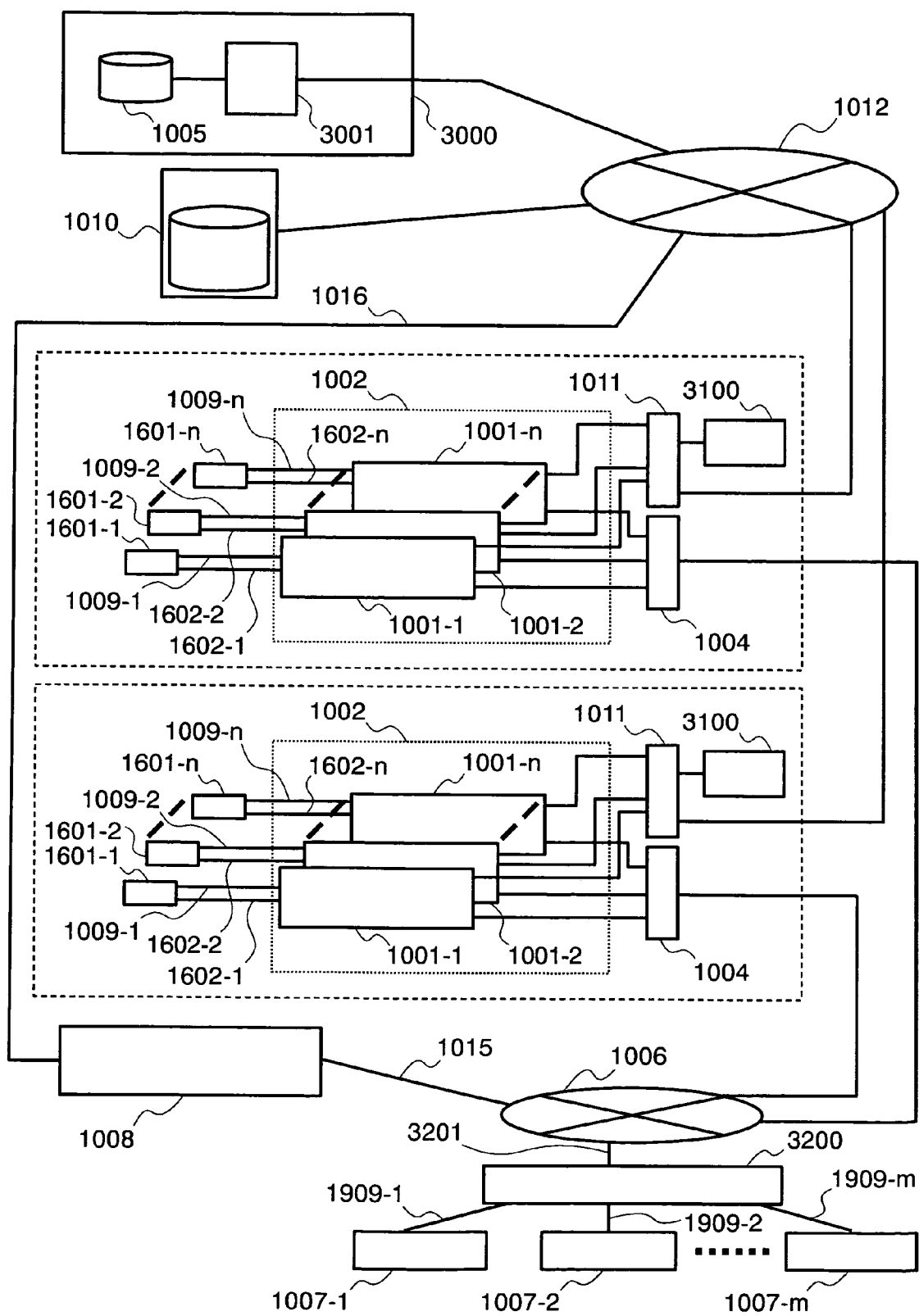
FIG. 30 exemplifies an entire structural block diagram of a ninth embodiment.

FIG. 30 is a diagram showing an example of a ninth embodiment.

In the above-mentioned embodiment, in order that the terminal device 1007 is coupled to the computer printed circuit board 1001 through the network, it is necessary to use network addresses (IP addresses) that have been allocated to the first communication function IFs 1209 of the respective computer printed circuit boards 1001. In this embodiment, an application gateway device 3200 is located between the network connection 1909 that is coupled with the terminal device 1007 and the first network 1006 to hold back the network address that has been allocated to the first communication function IF 1209 of the computer printed circuit board 1001 from the terminal device 1007. As a result, the security is enhanced.

FIG. 31 is a diagram showing an example of a conversion address table 3210 which is stored in the application gateway device 3200. In the conversion address table 3210, an IP address A 3211 that is allocated to the application gateway device 3200 and a connection port No. 3212, which are used when the terminal device 1007 is coupled to the application gateway device 3200 through the network connection 1909 are stored in association with an IP address B 3213 that is used as the network address indicative of a transmitted address and a connection port No. 3214 when the application gateway device 3200 is coupled to a device coupled to the first network 1006 through a network connection 3201.

In the case where the transmitted IP address included in the packet that has been transmitted from the terminal device 1007 coincides with the IP address A 3211, the application gateway device 3200 converts the transmitted IP address and the port No. included in the packet into the corresponding IP address B 3213 and the port No. 3214. Then, the application gateway device 3200 transmits the converted packet to the first network 1006.

Also, in the case where the transmitting IP address included in the packet that has been received through the first network 1006 coincides with the IP address B 3213, the application gateway device 3200 converts the transmitting IP address and the port No. included in the packet into the corresponding IP address A 3211 and the port No. 3212. Then, the application gateway device 3200 transmits the converted packet to the network connection 1909.

That is, the IP address at the side of the network connection 1909 of the application gateway device 3200 is set at the IP address A 3211. The IP address of a device that is coupled to the first network 1006 is set at the IP address B 3213. With this arrangement, the device that is coupled to the network connection 1909 and the device that is coupled to the first network 1006 can be coupled to each other over the network through the IP address of the application gateway device 3200. When the values of the IP address B 3213 are "000.000.000.000", the port No. 3212 is unused. A row 3215 is previously set with a value for connection of the terminal device 1007 with the management computer 1008 over the network.

The contents of the conversion address table 3210 of the application gateway device 3200 are registered through the management computer 1008 over the network.

Figure 32:
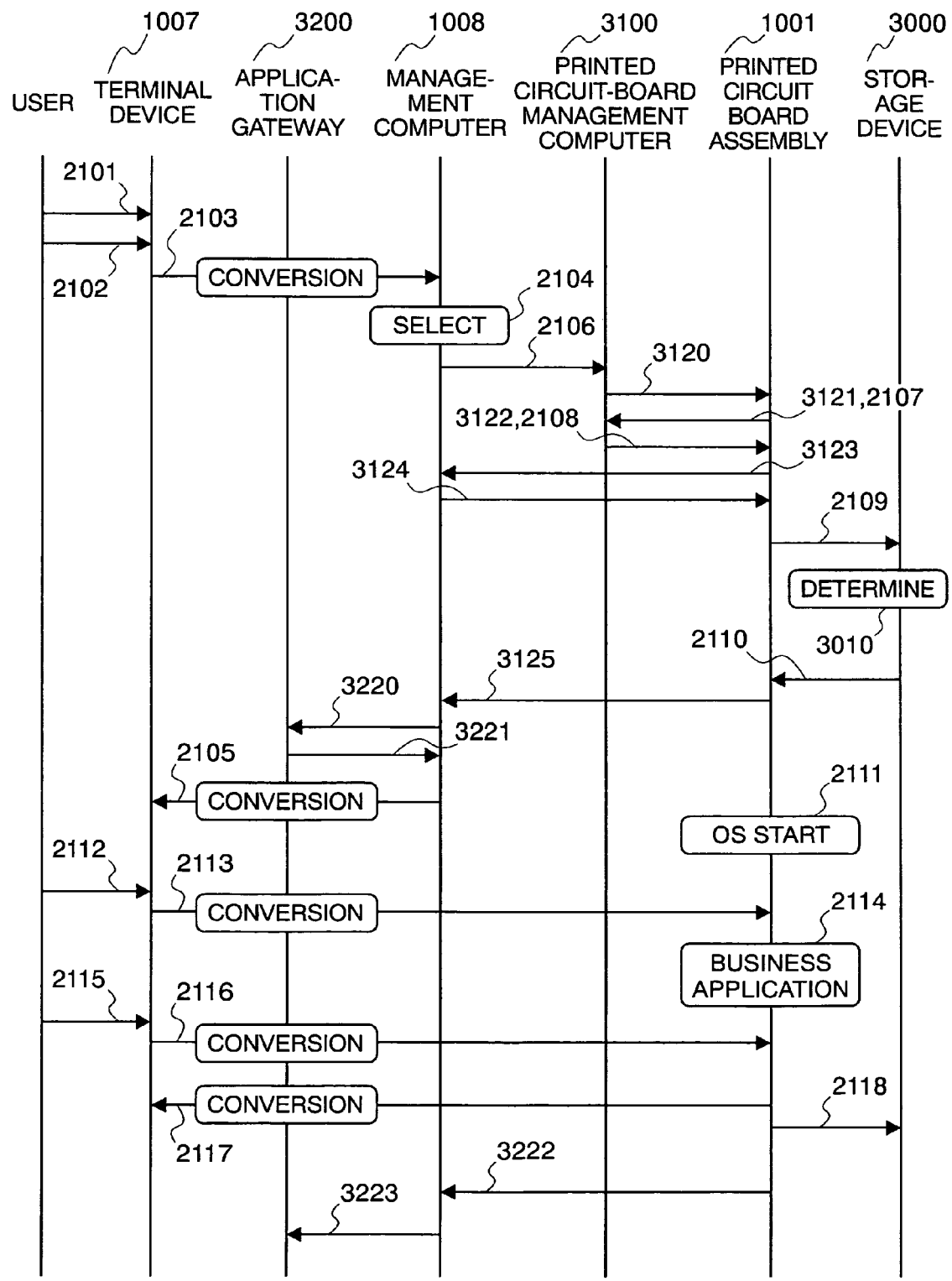
FIG. 32 exemplifies a process flowchart in the case of using an application gateway device.

FIG. 32 is a diagram showing a procedure example of a starting process at the time of using the application gateway device 3200. In this embodiment, steps 3120 to 3223 are added to the procedure shown in FIG. 29 as a new procedure. In FIG. 32, all of communications (Steps 2103, 2105, 2113, 2116, and 2117) between the terminal device 1007 and a device that is coupled to the first network 1006 pass through the application gateway device 3200. Specifically, a request from the terminal device 1007 is converted in the application gateway device 3200, and to the device coupled to the first network 1006, the communication is made to seem like it is from the application gateway device 3200. More specifically, the above operation is realized by converting the IP address and the port No. according to the value of the conversion address table 3210 in the application gateway device 3200 as described above.

In addition, through a sequential procedure according to a start request from the user, the management computer 1008 receives the IP address of the first communication function IF 1209 of the computer printed circuit board per se from the computer printed circuit board 1001 (Steps 2101 to 2104, 2106 to 2110, 3010, and 3120 to 3125). The management computer 1008 transmits the received IP address and information on a predetermined service port No. to the application gateway device 3200. Then, the management computer 1008 gives an allocation request of the new port No. 3212. The application gateway device 3200 seeks an unused row entry with reference to the conversion address table 3210. Then, the application gateway device 3200 writes the transmitted IP address and port No. at the IP address B 3213 and the port No. 3214 in the entry, respectively. Then, the application gateway device 3200 returns the IP address A 3211 and the port No. 3212 of the entry to the management computer 1008 (Step 3221). The management computer 1008 transmits the received IP address A 3211 and port No. 3212 to the terminal device 1007 (Step 2105), and the terminal device 1007 can execute the business through the subsequent sequential procedure (Steps 2111 to 2118).

In the case where the computer printed circuit board 1001 stops, the computer printed circuit board 1001 transmits a stop notification to the management computer 1008 (Step 3222). The management computer 1008 transmits the received notification transmitting IP address to the application gateway device 3200 (Step 3223). The application gateway device 3200 makes the entry that coincides with the transmitted IP address in an unused state to complete the sequential procedure.

Figure 10:
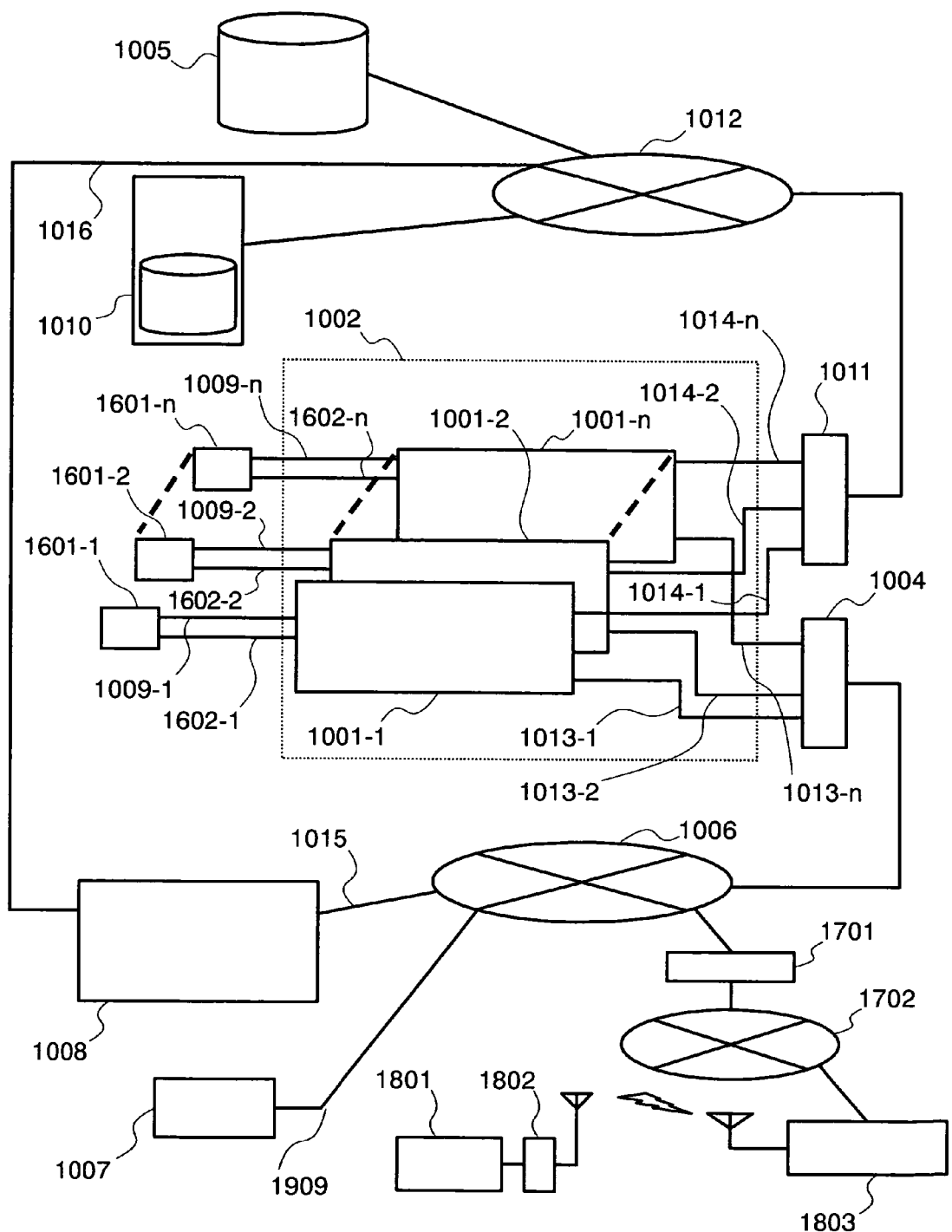
FIG. 10 exemplifies an entire structural block diagram of a fourth embodiment.

According to this embodiment, the application gateway device 3200 is located between the network connection 1909 that is coupled with the terminal device 1007 and the first network 1006, to hold back the network address that has been allocated to the computer printed circuit board 1001 from the terminal device 1007. As a result, the security is enhanced. It is needless to say that this embodiment can be applied to a configuration of using the remote terminal device 1703 over the internet 1702 as shown in FIG. 9, and a configuration of using the remote terminal device 1801 through the radio interface 1802 as shown in FIG. 10.

Also, this embodiment can be applied to a case in which the certification device 2002 is used in order to determine whether the user is right, or not, when the user uses the terminal device 1007, as shown in FIG. 12.

Figure 33:
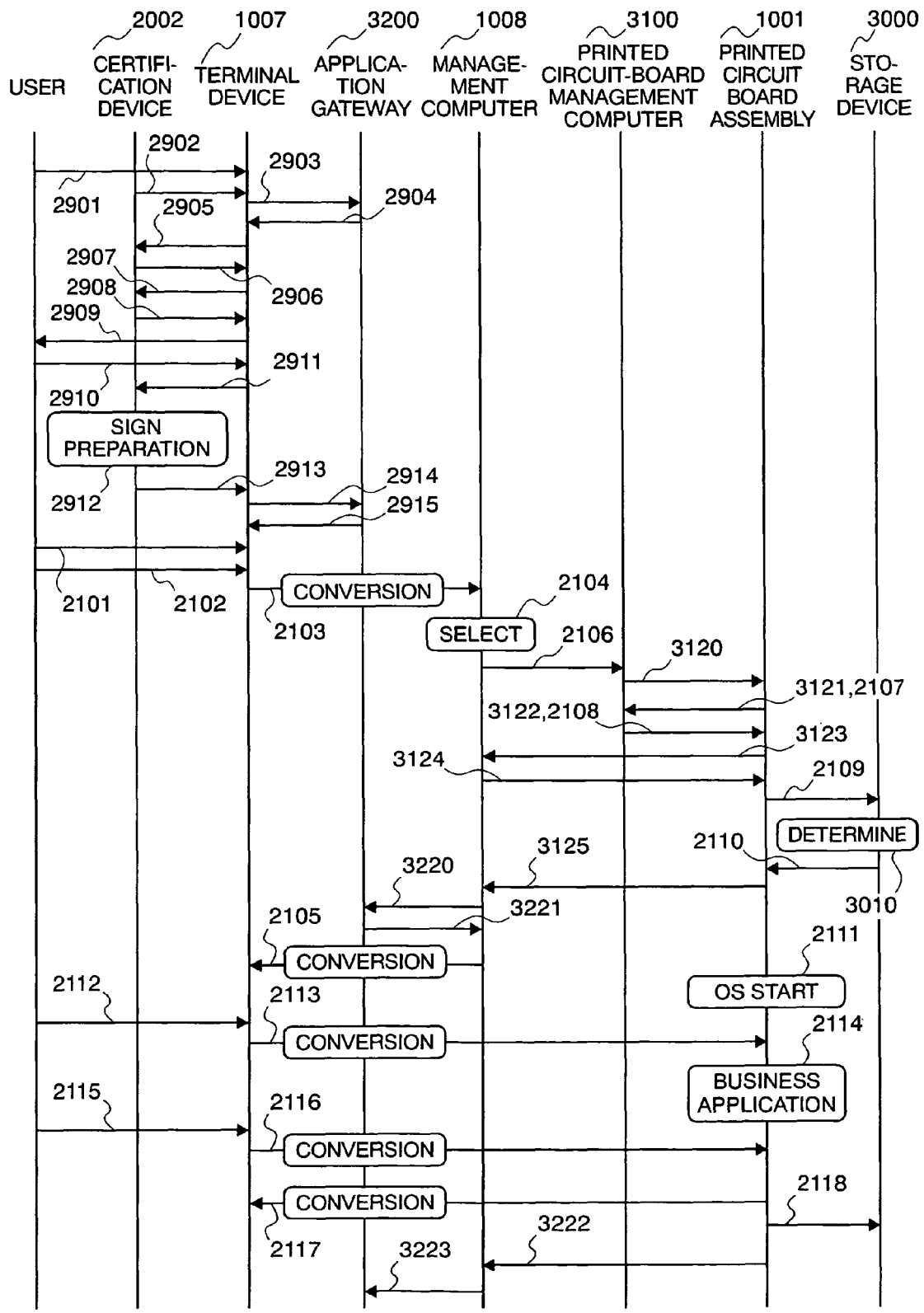
FIG. 33 exemplifies a process flowchart in the case of using the certification device.

FIG. 33 is a diagram showing a procedure example of a starting process of the computer printed circuit board 1001 in the case of using the certification device 2002. In this procedure, the application gateway device 3200 executes the process that has been executed by the management computer 1008 in the procedure described with reference to FIG. 22. The procedure after the common key exchange has been completed, that is, the procedure subsequent to the step 2101 is identical with the procedure shown in FIG. 32.

In addition, by combination of the above-mentioned embodiments, the user executes certification by using the certification device 2002 from the terminal device 1007. As a result, the management computer 1008 and the printed-circuit-board management computer 3100 are associated with each other. The OS and the business application program start with respect to the computer printed circuit board 1001 that has been allocated to the certified user by using the hard disk device within the storage device 3000 that has been allocated to the certified user. In addition, a communication path of the network connection that can be used by the certified user between the terminal device 1007 and the computer printed circuit board 1001 is established through the application gateway device 3200, thereby making it possible to execute the user's business in a secure and stable state.

Tenth Embodiment

Figure 35:
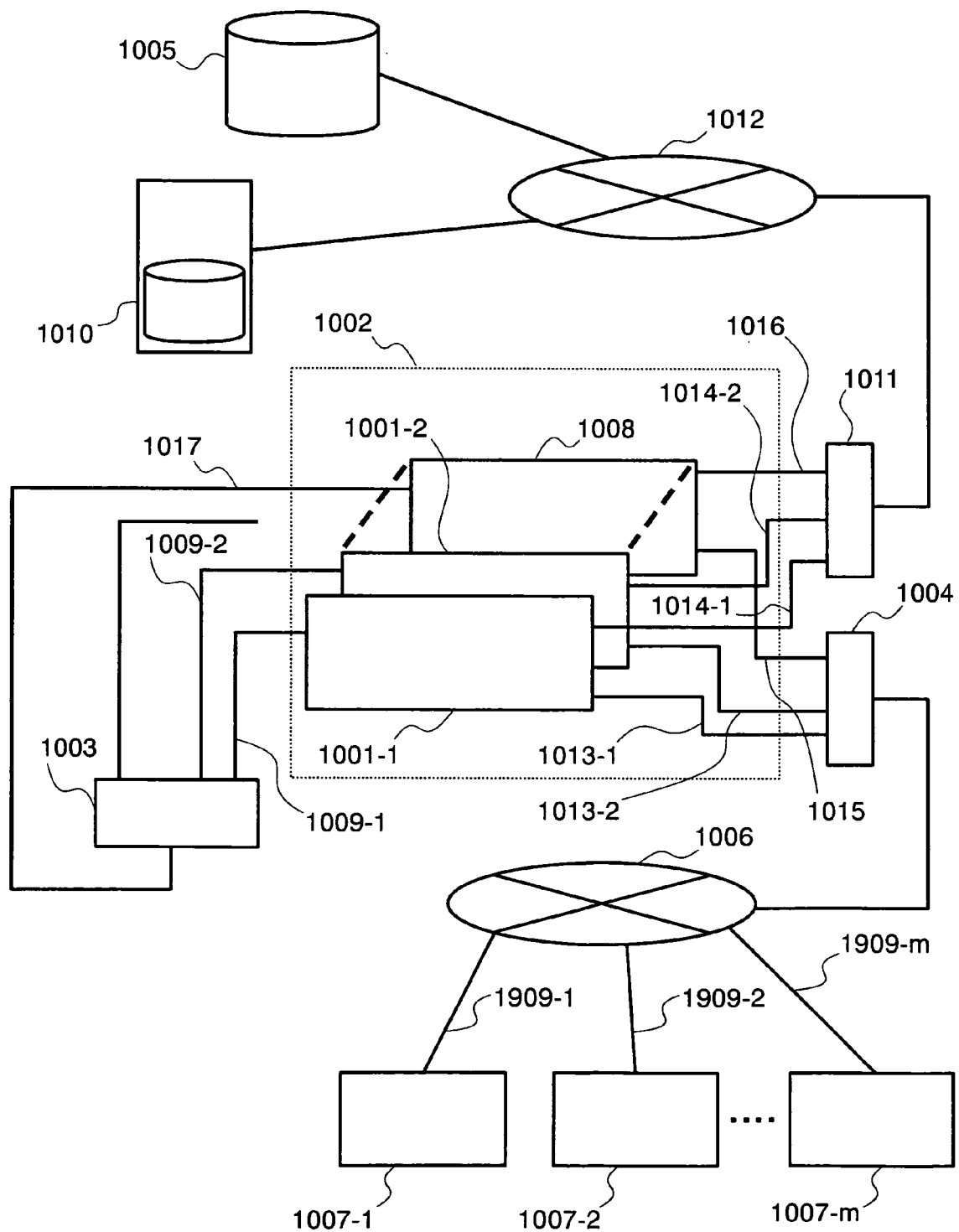
FIG. 35 exemplifies an entire structural block diagram of a tenth embodiment.

FIG. 35 shows a tenth embodiment of the present invention.

In FIG. 1, there has been described the example in which the management computer 1008 is configured as an independent device. However, the management computer 1008 is mounted as one of the computer printed circuit boards 1001 in this embodiment.

More specifically, the second communication line 1014 of the computer printed circuit board 1001 is utilized as the communication line 1016 that is used when the management computer 1008 connects to the second network 1012, and the first communication line 1013 of the computer printed circuit board 1001 is utilized as the communication line 1015 that is used when the management computer 1008 connects to the first network 1006.

The computer printed circuit board 1001 of the management computer 1008 includes, as similar to the configuration of the above-described management computer 1008, a power switch operated by a manager, an HDD, interfaces connecting to a keyboard, a mouse, a display and the like, and a general purpose I/O interface and the control line 1017 connecting to the power control mechanism 1003. With this configuration, the manager directly executes start or stop to thereby reduce an area required for installing the management computer 1008. Alternatively, the computer printed circuit board 1001 of the management computer 1008 may be remotely coupled and operated from the terminal for the manager, instead of providing the interfaces connecting to a keyboard, a mouse, a display and the like.

Eleventh Embodiment

Figure 36:
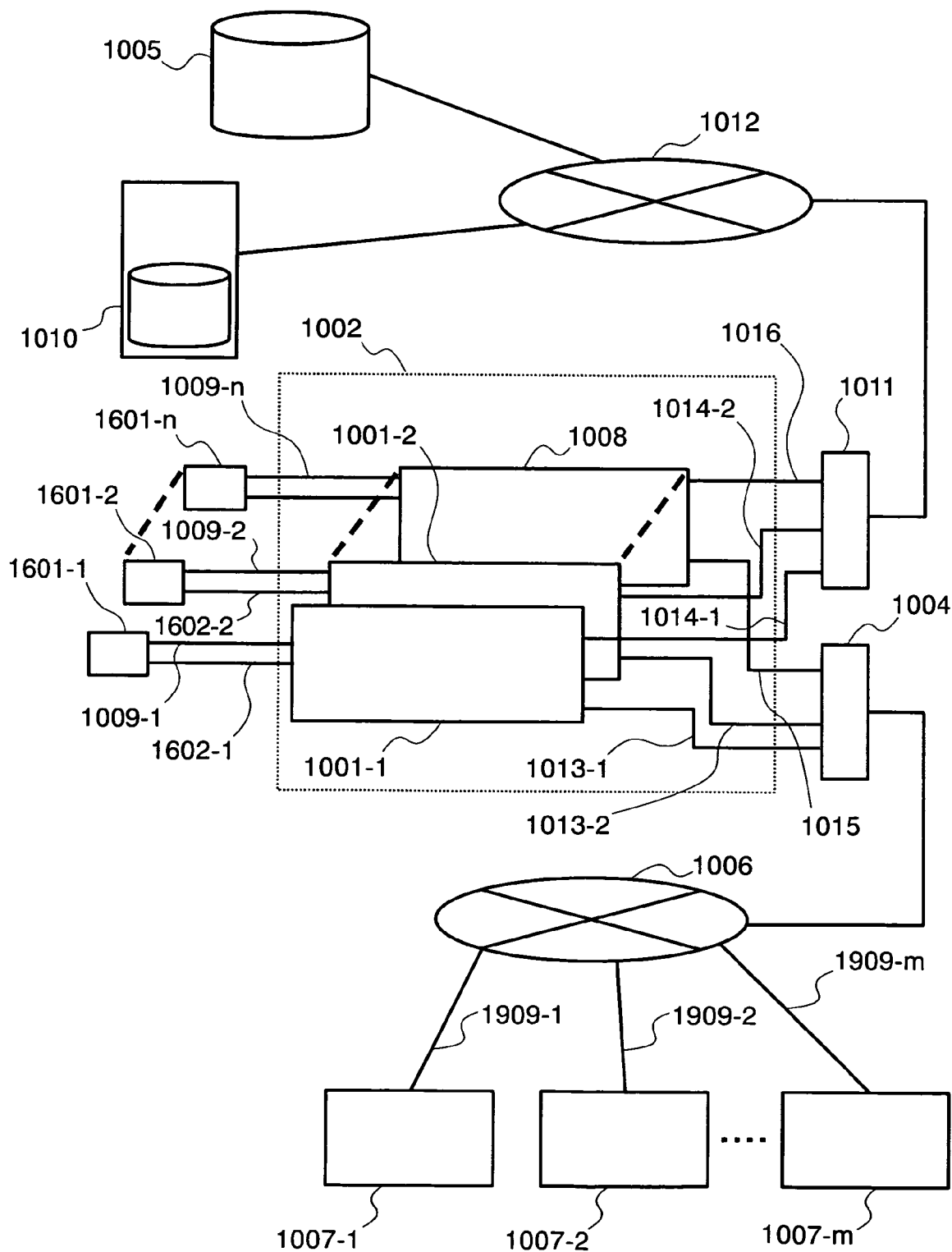
FIG. 36 exemplifies an entire structural block diagram of an eleventh embodiment.

FIG. 36 shows an eleventh embodiment of the present invention.

The power control of the computer printed circuit board 1001 is executed by the power control mechanism 1003 in the tenth embodiment shown in FIG. 35 as similar to the first embodiment. In this embodiment, the power control of the computer printed circuit board 1001 is executed by the computer printed circuit board 1001 for the management computer 1008 as similar to the second embodiment shown in FIG. 7. With this configuration, the effect similar to the one in the second embodiment can be obtained while reducing an area required for installing the management computer 1008.

The embodiments of the present invention have been described above. The present invention is not limited to the above-described embodiments. Further, the present invention can be implemented by combining the respective embodiments.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A computer system, comprising:
a computer device having a plurality of computer printed circuit boards, each of which includes a first network interface and a second network interface;
a plurality of terminal devices, each of which is coupled to each of the first network interfaces via a first network;
a storage device having a plurality of storage areas, which is coupled to each of the second network interfaces via a second network; and
a management computer which manages one or more of the computer printed circuit boards and the storage device,
wherein the management computer manages a correspondence between user information and the storage area,
wherein when a use request of the computer printed circuit board including the user information of the terminal device is transmitted from any one of the terminal devices, the management computer selects a usable computer printed circuit board among the plurality of computer printed circuit boards, and instructs the usable computer printed circuit board to turn on a power,
wherein the management computer reads information necessary to start the computer printed circuit board from the storage area corresponding to the transmitted user information in the storage device, and allows the computer printed circuit board to execute a start process on the basis of the read information, and
wherein the management computer notifies the terminal device that has transmitted the use request, of information on the computer printed circuit board that has become executable by the start process and identification information allocated to the selected and started computer printed circuit board on the first network.

2. The computer system according to claim 1,
wherein the management computer registers a correspondence between the user information and the selected computer printed circuit board number, and
wherein the management computer manages whether the computer printed circuit board is in a suspended mode, or not, on the basis of the registered correspondence.

3. The computer system according to claim 2,
wherein the management computer manages the hibernation state information of each computer printed circuit board to be used for each user,
wherein the management computer describes attribute information, which defines the performance of a CPU or a memory that is equipped on the computer printed circuit board, in the correspondence to be registered between the user information and the selected computer printed circuit board number, and
wherein when an inactive user transmits a use request again, the management computer allocates another computer printed circuit board having the same attribute information as that of the computer printed circuit board selected in the previous operation with reference to the registered correspondence between the user information and the selected computer printed circuit board number.

4. The computer system according to claim 3,
wherein when another computer printed circuit board having the same attribute information as that of the computer printed circuit board selected in the previous operation can not be selected, the management computer allocates another computer printed circuit board having the attribute information similar to that of the computer printed circuit board selected in the previous operation with reference to the correspondence between the user information and the selected computer printed circuit board number.

5. The computer system according to claim 1,
wherein the management computer predetermines a correspondence between the user information and the computer printed circuit board number,
wherein the management computer obtains state information of each computer printed circuit board in advance, and
wherein the management computer updates the state information of the computer printed circuit board in accordance with the start process of the selected computer printed circuit board.

6. The computer system according to claim 5,
wherein the management computer manages hibernation state information of each computer printed circuit board, and
wherein the management computer determines whether the computer printed circuit board is not-in-use or not, with reference to the state information of the computer printed circuit board and the hibernation state information of the computer printed circuit board.

7. The computer system according to claim 6,
wherein the terminal device is coupled with a storage medium that stores certification information having the user information therein,
wherein the management computer registers the correspondence between the user information and the selected computer printed circuit board number,
wherein the management computer refers to the certification information, the managed correspondence between the user information and the storage area, and the registered correspondence between the user information and the computer printed circuit board number, and
wherein the management computer specifies the computer printed circuit board and the storage area that can be used by the user.

8. The computer system according to claim 1,
wherein one of the computer printed circuit boards includes a storage device having a storage area for the computer printed circuit board, and
wherein the computer printed circuit board having the storage device is used as the management computer.

\* \* \* \* \*